(12) United States Patent
Azami

(10) Patent No.: US 7,369,263 B2
(45) Date of Patent: May 6, 2008

(54) PRINTING SYSTEM, PRINTING APPARATUS AND PRINTING APPARATUS CONTROL PROGRAM

(75) Inventor: Osamu Azami, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1097 days.

(21) Appl. No.: 10/704,189

(22) Filed: Nov. 7, 2003

(65) Prior Publication Data

US 2004/0139402 A1 Jul. 15, 2004

(30) Foreign Application Priority Data

Nov. 8, 2002 (JP) .......................... P.2002-325458
Nov. 8, 2002 (JP) .......................... P.2002-325459

(51) Int. Cl.
*G06K 1/00* (2006.01)
*G06F 15/00* (2006.01)
*G06F 3/048* (2006.01)

(52) U.S. Cl. ................ 358/1.16; 358/1.15; 715/527; 715/838

(58) Field of Classification Search ............... 358/1.16, 358/1.15; 715/527, 838
See application file for complete search history.

(56) References Cited

FOREIGN PATENT DOCUMENTS

| JP | 10-269036 | 10/1998 |
|---|---|---|
| JP | 10-297057 | 11/1998 |
| JP | 2000-339121 | 12/2000 |
| JP | 2002209131 | 7/2002 |

OTHER PUBLICATIONS

Patent Abstracts of Japan, Publication No. 10-297057, Publication Date Nov. 10, 1998, 2 pages.
Patent Abstracts of Japan, Publication No. 2000-339121, Publication Date Dec. 8, 2000, 1 page.
Patent Abstracts of Japan, Publication No. 2002-209131, Publication Date Jul. 26, 2002, 2 pages.

*Primary Examiner*—Douglas Q. Tran
*Assistant Examiner*—Thomas J. Lett
(74) *Attorney, Agent, or Firm*—Osha Liang LLP

(57) ABSTRACT

According to a printing system of the present invention, each host performs a process for creating and storing a preview file when transmitting reserve job data to a printing apparatus, and a process for generating and transmitting reserve job data that includes preview file designation data representing the storage location of the preview file. The printing apparatus manages each set of preview file designation data in correlation with reserve job data, and supplies a preview file correlated with reserve job data, or preview file designation data, to the host that requires the preview file.

12 Claims, 14 Drawing Sheets

FIG. 2

| JOB ID | REGISTRATION DATE AND TIME | USER NAME | JOB NAME | JOB TYPE | NUMBER OF COPIES | PREVIEW FILE DESIGNATION DATA |
|---|---|---|---|---|---|---|
| 1 | 2002/8/28 09:39:50 | iromaru | Color Circle (Pic) | stored | 1 | Null (No Preview File) |
| 2 | 2002/9/8 12:09:50 | iromaru | Color Circle (avo) | stored | 2 | ¥¥pc003¥printspool¥thumbnail1.jpg |
| 3 | 2002/9/10 16:19:20 | Admin1 | Calender | stored | 2 | ¥¥pc001¥MyDocumenet¥sample.jpg |
| 4 | 2002/9/15 10:09:20 | user A | risu | stored | 1 | risu.jpg |

PRINTING SYSTEM, PRINTING APPARATUS AND PRINTING APPARATUS CONTROL PROGRAM

The present application is based on Japanese Patent Applications No. 2002-325458 and 2002-325459, which are incorporated herein by reference.

BACKGROUND OF THE INVENTION

1. Field of the Invention

The present invention relates to a printing system wherein a printing apparatus and one or more hosts are interconnected across a network, a printing apparatus used in connection with a computer network, and a printing apparatus control program to be executed by a computer connected to a printing apparatus across a network.

2. Description of the Related Art

As is well known, of the printing apparatuses, such as network printers and copiers, for connection to a computer network, there are apparatuses that are designed to internally store printing job data that are received in a predetermined form.

Many of these printing apparatuses perform printing, based on printing job data, when users employ PCs, connected to the printing apparatuses across a network, to select identification information (normally a user name and a job name) for specific printing job data stored in the printing apparatuses. In order to simplify the selection of the printing job data to be printed, another printing apparatus has been developed that permits a PC user to select printing job data while viewing a preview image (a thumbnail image), one of which is provided for each set of printing job data stored in the printing apparatus.

Specifically, an example printing apparatus (see patent document 1) has been developed that performs a process for internally storing printing job data that is received, and a process for preparing and internally storing preview image data for the printing job data and for supplying sets of the internally stored preview image data to a PC that is executing a Web browser or a special browser, i.e., permits the Web browser or the special browser to display images based on the preview image data.

[Patent Document 1] JP No. Hei-10-269036

In a printing system including a printing apparatus that permits a PC to display a preview image, i.e., a computer network to which such a printing apparatus is connected, each user can view preview images displayed on his or her PC and apprehend the contents of printing job data other users have stored in the printing apparatus. As a result, each reserve job data set stored in the printing apparatus can be effectively utilized. Further, even when a user forgets the identification information, such as a job name, for printing job data that he or she has stored in the printing apparatus, material desired by the user can be generated by the printing apparatus.

However, since a conventional printing system, which comprises a printing apparatus that permits a PC to display a preview image, employs the printing apparatus to create preview image data, the probability that the printing apparatus will be busy is higher than it is for a printing system employing a printing apparatus that performs only a process for internally storing the printing job data that are received.

As is described above, as conventional printing apparatuses that can internally store print job data, available are both an apparatus that can provide preview image data for a PC and an apparatus that can not provide preview image data for a PC. However, either printing apparatus transmits, to a user PC, information for displaying a screen for selecting print job data to be printed (a screen for displaying only identification information for print job data stored in a printing apparatus, or a screen for displaying a preview image along with identification information).

In other words, when a user employs his or her PC to permit a conventional printing apparatus to print specific print job data that have been stored internally, the printing apparatus does not start the printing of this print job data until the exchange of the information for displaying the selection screen has been completed.

SUMMARY OF THE INVENTION

It is, therefore, one objective of the present invention to provide a printing system that permits each host to display a preview image for each printing job data set stored in a printing apparatus, and that ensures there is a low probability that the printing apparatus will be busy, when compared with a printing system that permits a printing apparatus to create preview image data.

It is, therefore, another objective of the present invention to provide a printing system, wherein a printing apparatus and one or more hosts are interconnected across a network, that can complete, within a short period of time, an operation for instructing the printing of print job data sets that are stored in the printing apparatus.

It is still another objective of the invention to provide a printing apparatus that can constitute the printing system of the invention.

It is an additional objective of the invention to provide a printing apparatus control program that permits a computer to serve as a host in the printing system of the invention.

According to the present invention, a printing system wherein a printing apparatus and one or more hosts are interconnected across a network is provided; each of the hosts includes: a preview file storage unit, a reserve job data generator/transmitter for, before reserve job data are generated and transmitted as print job data for storage in the printing apparatus, creating a preview file, constituting an image data file representing an overview of printed matter to be generated by said printing apparatus based on the reserve job data, and storing the preview file in the preview file storage means, and for performing a reserve job data generation/transmission process during which reserve job data, which include location information for designating a storage location for the preview file, content information for designating the contents of the printed matter to be printed by the printing apparatus and identification information for job designation information for internal data, are generated and transmitted to the printing apparatus, a transmission request response unit for responding to a transmission request, received from another apparatus, for a preview file stored in the preview file storage unit, and a printing instruction information transmitter that serves as a unit having a function for displaying images based on the preview files stored in the preview file storage unit of the host and in the preview file storage units of the other hosts, and a function for transmitting, to the printing apparatus, printing instruction information that includes the job designation information for the reserve job data corresponding to a preview file for which an image display is currently being performed, and that also serves as a unit that is activated upon the reception of various types of information from another apparatus; wherein the printing apparatus includes a reserve job file storage unit for storing, in correlation with the job designation information, the reserve job files, including the information that designates the contents of printed material, a management information storage unit for storing, for each reserve job file stored in the reserve job file storage unit, management information that includes the job designation information and the storage location information, a reserve job file creation unit for, upon receiving the reserve job data from a specific host, creating the reserve job file based on the reserve job data and storing the reserve job file in the reserve job file storage unit, and for adding, to the management information storage unit, the management information that includes the storage location information and the job designation information included in the reserve job data, an information transmitter capable of transmitting, to each of the hosts, the job designation information included in each set of the management information stored in the management information storage unit, and information corresponding to the storage location information included in the management information, and a reserve job printing unit for, upon receiving the printing instruction information from the specific host, initiating printing based on the reserve job file that is stored in the reserve job file storage unit in correlation with the job designation information included in the printing instruction information.

Specifically, the printing system of the invention is a system wherein a host for transmitting reserve job data to a printing apparatus creates a preview file (a file for preview image data) for the reserve job data, and wherein, since the transmission request response unit and the printing instruction information transmitter of each host and the information transmitter of the printing apparatus interact with each other to provide an environment wherein the user of each host, while watching preview images (images displayed by the printing instruction information transmitter based on the preview files) for the reserve job data sets stored in the printing apparatus, can select reserve job data to be printed. Therefore, the printing system of the invention permits each host to display the preview images for the printing job data sets (reserve job data sets) stored in the printing apparatus. Thus, when the configuration provided by this printing system is employed, the probability that the printing apparatus will be busy is less than when a conventional printing system is used wherein the printing apparatus creates a preview file (preview image data).

For the configuration of the printing system of this invention, the information transmitter of the printing apparatus may be a unit that, to transmit information corresponding to the storage location information included in the management information, obtains a preview file, specified by the storage location information, from a host holding the preview file and transmits the preview file. And the printing instruction information transmitter of each of the hosts may be a unit that is activated by obtaining, from the printing apparatus, the preview files stored in the preview file storage units of the other hosts. Further, the information transmitter of the printing apparatus maybe a unit for, instead of transmitting information correlated with the location storage information in the management data, transmitting the location storage information itself. In addition, the printing instruction information transmitter of each host may be a unit that is operated by obtaining a preview file from the preview file storage unit of another host.

For the configuration of the printing system of the invention, at least one of the hosts may include, as the reserve job data generator/transmitter, a unit having a function for performing the reserve job data generation and transmission process, and a function for performing a second reserve job data generation and transmission process that, instead of creating the preview file, generates and transmits the printing apparatus, second reserve job data, which includes creation instruction information for instructing the printing apparatus to create the preview file, information designating the contents of the material to be printed by the printing apparatus and the job designation information. Further, the printing apparatus may also include an internal preview file storage unit for storing preview files. And the reserve job file generator may be a unit that, upon receiving the second reserve job data, employs the second reserve job data to create the reserve job file and the preview file and respectively stores the reserve job file and the preview file in the reserve job file storage unit and the internal preview file storage unit, and that adds to the management information storage unit management information, including the location designation information designating the preview file and the job designation information included in the second reserve job data that are received. In addition, the information transmitter may be a unit that is capable of transmitting, to each of the hosts, the job designation information included in each set of management information stored in the management information storage unit, information corresponding to the storage location information included in the management information, and each preview file stored in the internal preview file storage unit.

That is, the printing system of the invention may be designed so that, as needed, users of some hosts can employ the printing apparatus to create preview files.

By using the printing apparatus of the invention, which serves as the printing apparatus of the printing system of the invention, the printing system permits the hosts to display preview images for the reserve job data sets stored in the printing apparatus, and thus, when compared with a conventional printing system that employs the printing apparatus to create preview files, the probability that the printing apparatus will be busy is low.

Moreover, a printing apparatus control program, which is to be executed by a computer connected to a printing apparatus across a network, to supply print job data to the printing apparatus, which operates the computer as an apparatus comprising: a preview file storage unit; and a reserve job data generator/transmitter for, before reserve job data are generated and transmitted as print job data for storage in the printing apparatus, creating a preview file, constituting an image data file representing an overview of printed matter to be generated by said printing apparatus based on the reserve job data, and storing the preview file in the preview file storage means, and for performing a reserve job data generation/transmission process during which reserve job data, which include location information for designating a storage location for the preview file, content information for designating the contents of the printed matter to be printed by the printing apparatus and identification information for job designation information for internal data, are generated and transmitted to the printing apparatus. Therefore, when the printing apparatus control program is employed together with a program, such as an OS, for operating a computer as the transmission request unit, and a program, such as a Web browser, for operating the computer as the printing instruction information transmitter, the computer can be employed as the host for the printing system of the invention.

Further, according to the present invention, a printing system wherein one or more hosts, each of which includes a display device and an input device, and a printing apparatus are interconnected across a network, is provided; wherein each of the hosts includes: a printing instruction file storage unit, a reserve job data generator/transmitter for generating reserve job data, which includes content definition data that define the contents of printed material and unique identification information, and transmitting the reserve job data to the printing apparatus for storage, and for generating a printing instruction file, which includes the same identification information stored in the reserve job data, and storing the printing instruction file in the printing instruction file storage unit, and a printing command transmitter having a function for displaying, on the display device, names of printing instruction files stored in the printing instruction file storage unit, and a function for, when a printing instruction, including the designation of a printing instruction file, is entered into the input device, transmitting to the printing apparatus a printing command that includes the identification information in the printing instruction file that has been designated; and wherein the printing apparatus includes a reserve job data processor for internally storing the reserve job data received from the host, and a printing unit for, when the printing command is received from the host, performing printing based on the reserve job data internally stored by the reserve job data processor and identified by the identification information included in the received printing command.

During the processing (the processing performed by the printing command transmitter) during which particular information is obtained from the printing apparatus, the thus arranged printing system of the invention can instruct the printing apparatus to start the printing of a reserve job. Therefore, the printing system of the invention functions as a system that completes, within a short period of time, an operation for instructing the printing of print job data sets stored in the printing apparatus.

For the configuration of the printing system of the invention, in order to enable a user to confirm the contents of reserve job data, the reserve job data generator/transmitter of each of the hosts can be a unit for generating reserve job data that includes unique identification information and content definition data, which define the contents of printed material, and transmitting the reserve job data to the printing apparatus, and for generating a printing instruction file that includes the unique identification information and image data representing an overview of the printed material and storing the printing instruction file in the printing instruction file storage unit. And the printing command transmitter of the host can be a unit having a function for displaying, on the display device, names of printing instruction files stored in the printing instruction file storage unit, a function for displaying, on the display device, images in accordance with the image data included in the printing instruction files that are stored in the printing instruction file storage unit, and a function for, when a printing instruction including the designation of a printing instruction file is entered using the input device, transmitting to the printing apparatus a printing command that includes identification information contained in the printing instruction file that has been designated.

According to the invention, provided is a printing control program, which is to be executed by a computer connected to a printing apparatus that includes a function for internally storing reserve job data that are received and that includes content definition data, which defines the contents of printed material, and unique identification information, and a function for, upon the reception of a printing command having a predetermined form that includes identification information, performing printing based on reserve job data that are internally stored and are identified by the identification information, and which permits the computer to serve as an apparatus comprising: a printing instruction file storage unit; and a reserve job data generator/transmitter, for generating the reserve job data that include the content definition data that define the contents of a printed material and the unique identification information and transmitting the reserve job data to the printing apparatus, and also for generating a printing instruction file, which includes the identification information that are also contained in the reserve job data and according to which a predetermined program transmits to the printing apparatus the printing command that includes the identification information held in the printing instruction file, and for storing the printing instruction file in the printing instruction file storage unit.

Therefore, when the printing control program of the invention is used, a computer can be employed as the host of the invention.

The printing control program of the invention may be constituted by either one program, or several programs.

Furthermore, the printing control program of the invention may be so constituted (prepared) that the reserve job data generator/transmitter is a unit for generating reserve job data including content definition data, which define the contents of printed material, and unique identification information, and transmitting the reserve job data to the printing apparatus, and also generating a printing instruction file, which includes the identification information and image data representing an overview of the printed material and according to which the predetermined program displays an image in accordance with the image data included in the printing instruction file and transmits to the printing apparatus the printing command that includes the identification information held in the printing instruction file, and for storing the printing instruction file in the printing instruction file storage unit.

BRIEF DESCRIPTION OF THE DRAWINGS

In the accompanying drawings:

FIG. 2 is a diagram for explaining a job management file stored in the printing apparatus according to the embodiment;

DETAILED DESCRIPTION OF THE PREFERRED EMBODIMENTS

One preferred embodiment of the present invention will now be described in detail while referring to the accompanying drawings.

An overview of a printing system according to one embodiment of the invention will now be explained while referring to FIGS. 1A, 1B and 2.

Figure 1A:
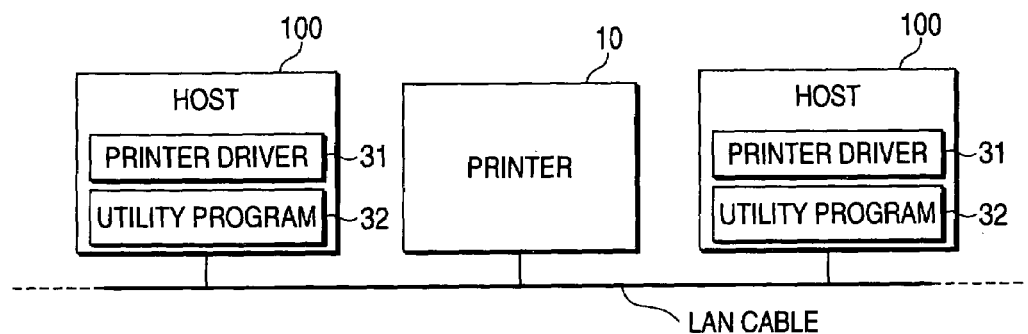
FIGS. 1A and 1B are diagrams for explaining the configuration of a printing system according to one embodiment of the present invention.

As is shown in FIG. 1A, the printing system of the invention is so designed that a LAN cable interconnects a printing apparatus 10 and several hosts 100.

Figure 1B:
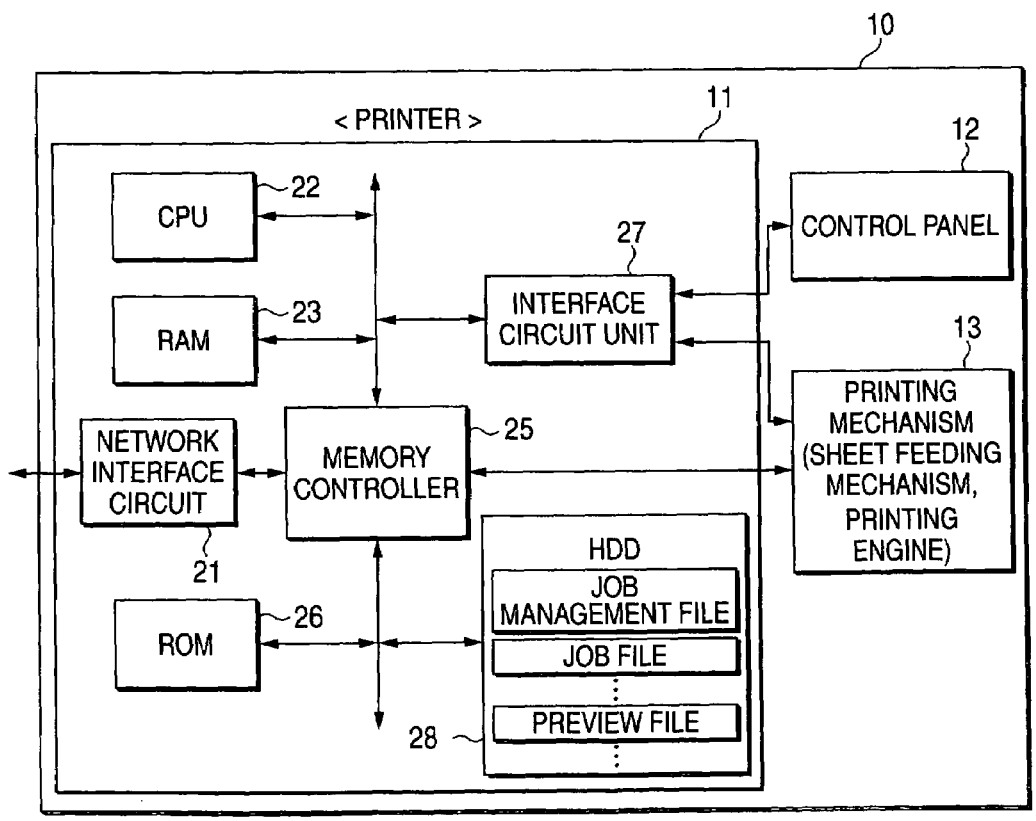

As is shown in FIG. 1B, the printing apparatus 10 of the printing system is an apparatus, a so-called a network printer, comprising a controller 11, a control panel 12 and a printing mechanism 13.

The printing mechanism 13 of the printing apparatus 10 is a unit for performing the actual printing of a sheet, and includes a sheet supply device, a sheet feeding mechanism and a printing engine. The control panel 12 is an interface between a user and the printing apparatus 10, and includes multiple buttons (push button switches), for the entry, by the user, of various instructions, and several LEDs and a liquid crystal panel used to display, for the user, the operating state of the printing apparatus 10.

The controller 11 is a unit having a function for receiving data (printing job data, HTTP requests and control commands) from each host 100, and for performing processes corresponding to the data received, and a function for performing a process consonant with an instruction entered at the control panel 12 by the user. The controller 11 includes a network interface circuit 21, a CPU 22, a RAM 23, a memory controller 25, a ROM 26, an interface circuit unit 27 and an HDD 28.

The network interface circuit 21 of the controller 11 is a circuit used for communication (exchanging information) with the individual hosts 100. The ROM 26 is a nonvolatile memory in which programs and font data are stored. And the CPU 22 is a control circuit for controlling all the individual sections of the controller 11 in accordance with the programs stored in the ROM 26.

The RAM 23 is a memory used for temporarily storing printing job data received by the network interface circuit 21 and CPU 22 generated data based on the printing job data, and is also used as a memory for the programs read from the ROM 26. The memory controller 25 is a circuit for performing a process, in accordance with an instruction from the CPU 22, for transferring data from the network interface circuit 21 to the RAM 23, or a process for transferring data from the RAM 23 to the printing engine of the printing mechanism 13. And the interface circuit unit 27 is a unit (a set of interface circuits) used by the CPU 22 for exchanging information with the control panel 12 and the feeding mechanism of the printing mechanism 13.

The HDD 28 is an auxiliary storage device used to store a job management file, a reserve job file (a job file in FIG. 1(B)) and a preview file.

The reserve job file is a file, created by the controller 11, for storing printing job data (hereinafter referred to as reserve job data) that is received and that includes, in its header, information indicating where the internal data should be stored (held).

The preview file is a file for preview image data having a comparatively low resolution (so-called thumbnail image data), representing an overview of printed matter obtained by the printing apparatus 10 based on the reserve job file. For the printing system of the invention, it should be noted that, generally, a preview file for each reserve job file is created by each host 100 that has transmitted reserve job data.

The job management file is a file prepared in the HDD 28 to manage a group of reserve job files on the HDD 28 and a group of preview files held by the host 100 and stored on the HDD 28. In the job management file held by the printing apparatus 10 of this embodiment, a job management record can be stored that includes, as is typically shown in FIG. 2, a job ID, a registration date, a user name, a job name, job type data, the number of copies, and preview file designation data. These data will be described in detail later.

Each of the hosts 100 (FIG. 1) of the printing system of the invention is a common computer (a computer in which an OS and a Web browser are installed) that is connected to the printing apparatus 10 along a LAN, and wherein are installed a utility program 32 and a printing apparatus control program 31, which is a program developed for the printing apparatus 10 and used for Windows OS by Microsoft (Microsoft and Windows are Microsoft Corporation trademarks registered in the United States and in other countries).

The printing apparatus control program 31 is a program, a so-called printer driver, for employing data for a document that is received from an application program (and an OS) as a printing object, and for generating printing job data to be transmitted to the printing apparatus 10. The utility program 32 is a program for providing, for a user of a host 100, an environment wherein the user can easily employ the reserve job data stored (mainly by the pertinent user) in the printing apparatus 10. As the utility program 32, provided are a first utility program 32 and a second utility program 32 for which the methods differ. These programs 31 and 32 will be described in detail later. In the printing system of the embodiment, when a Web browser is installed in a host 100, the host 100 can employ the reserve job data stored in the printing apparatus 10 without employing a utility program 32, i.e., without a utility program 32 being installed in the host 100. In this embodiment, a program constituted by the printing apparatus control program 31 and the first/second utility program 32 is a printing control program.

With this arrangement as a premise, the configuration and the operation of the printing system of this embodiment will be described more specifically.

First, the functions of the printing apparatus control program 31 and the operation of the printing apparatus 10 (controller 11), performed upon the reception of printing job data, will be described while referring to FIGS. 3 to 5.

Figure 3:
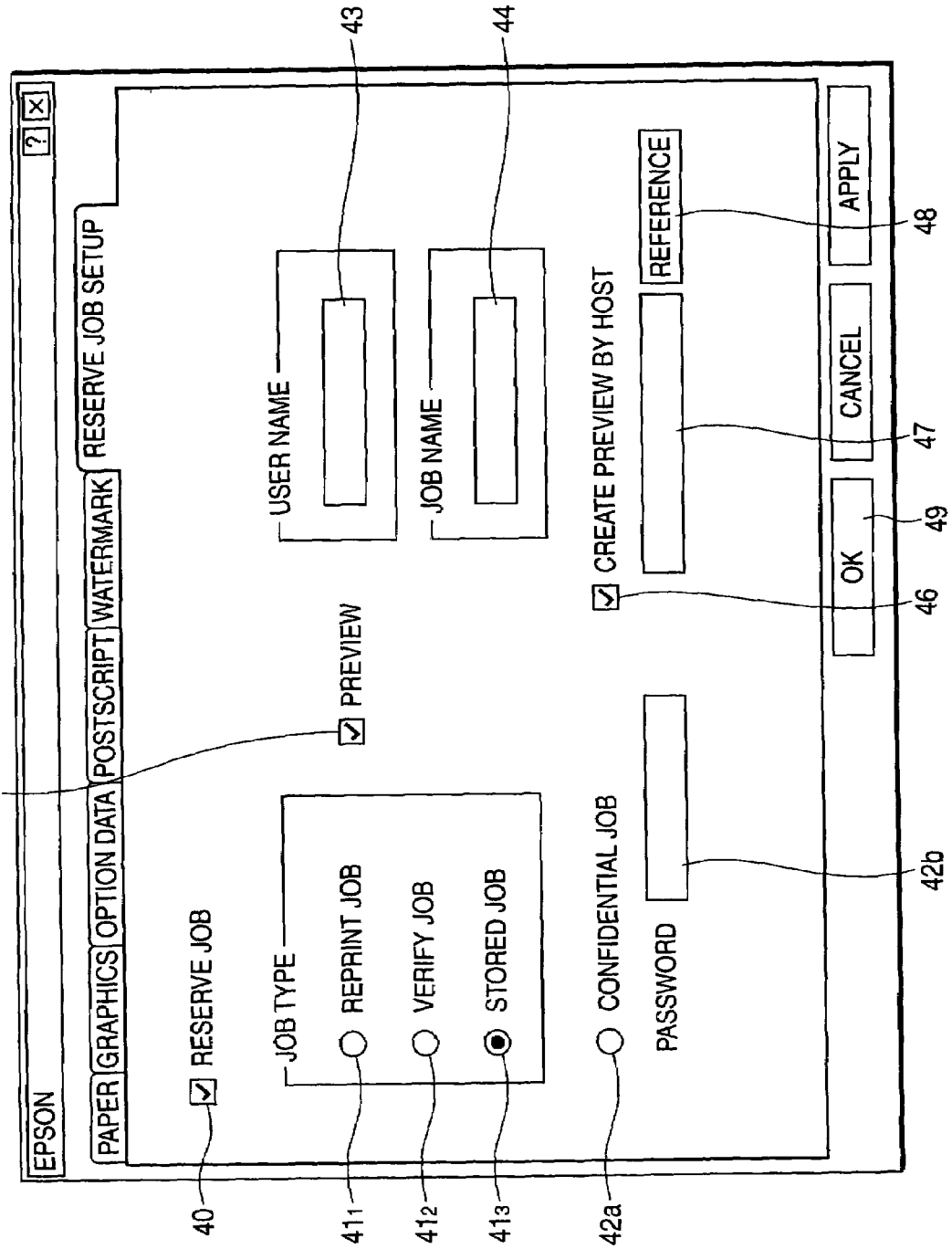
FIG. 3 is a diagram for explaining an operating condition setup dialogue box displayed by a printing apparatus control program according to the embodiment.

The printing apparatus control program 31 displays as a so-called printer property dialogue box, an operating condition setup dialogue box shown in FIG. 3.

In the operating condition setup dialogue box, a user enters a tick mark in a reserve job check box 40 indicating that the host 100 (printing apparatus control program 31) is permitted to generate reserve job data (data incorporating information designating the storage location for the internal data is included in the header).

Three job type buttons $41_1$, to $41_3$, a confidential job button 42a and a password setup text box 42b are control buttons manipulated by a user who has entered a tick mark in the reserve job check box 40 in order to designate as reprint job data, verify job data, stored job data or confidential job data the reserve job data generated by the printing apparatus control program 31.

The reprint job data are data stored in the printing apparatus 10 that are to be abandoned when the printing apparatus 10 is powered off. The verify job data are data stored in the printing apparatus 10 that are to be abandoned when the printing apparatus 10 is powered off and that, when received, are used for printing only one copy. The stored job data are data stored in the printing apparatus 10 that are not to be abandoned when the printing apparatus 10 is powered off. And the confidential job data are data stored in the printing apparatus 10 that are not to be abandoned when the printing apparatus 10 is powered off and that require the entry of a password when a printing instruction is entered.

A user name entry column 43 and a job name entry column 44 are text boxes in which the name of the user who has entered a tick mark in the reserve job check box 40 and the name of the reserve job data are typed.

A preview check box 45 is a check box in which a user must enter a tick mark to instruct the printing system (either the host 100 or the printing apparatus 10) to create a preview file. And a host designation check box 46 is a check box in which a user should must a tick mark to permit the host apparatus 100 (printing apparatus control program 31) to create a preview file.

A preview file name text box 47 is a text box that a user who has entered tick marks in both the preview check box 45 and the host designation check box 46, i.e., a user who has designated the creation, by the host 100, of a preview file, enters the name of a preview file (hereinafter referred to as a preview file name) that does not include an extension and a path name. And a reference button 49 is the one that a user depresses to designate (change) the folder in which the preview file should be stored. When the reference button 49 is depressed, the printing apparatus control program 31 displays a dialogue box to permit a user to select a folder, and stores, as a preview file storage folder (hereinafter referred to as a preview folder), the folder selected by the user in the dialogue box.

An OK button 49 is the one depressed by a user who has completed the setting up of various conditions. When the OK button 49 is depressed, the printing apparatus control program 31 stores data (hereinafter referred to as operating condition data) indicating various conditions (the control states in the operating condition setup dialogue box when the OK button 49 is depressed) designated by the user. The operating condition setup dialogue box is then erased from the display of the host 100.

The printing apparatus control program 31 initiates the following program when the start of generation of printing job data is instructed (when the OK button in the printing dialogue box, displayed by the application program, is depressed when the printing apparatus 10 has been selected as the printer to be used for printing).

Specifically, upon the reception of an instruction to start the generation of printing job data, the printing apparatus control program 31 determines whether the current operating condition information has designated the generation of reserve job data. When the operating condition information has designated the generation of reserve job data, the printing apparatus control program 31 determines whether the operating condition information has designated that the host 100 prepare a preview file.

Figure 4A:
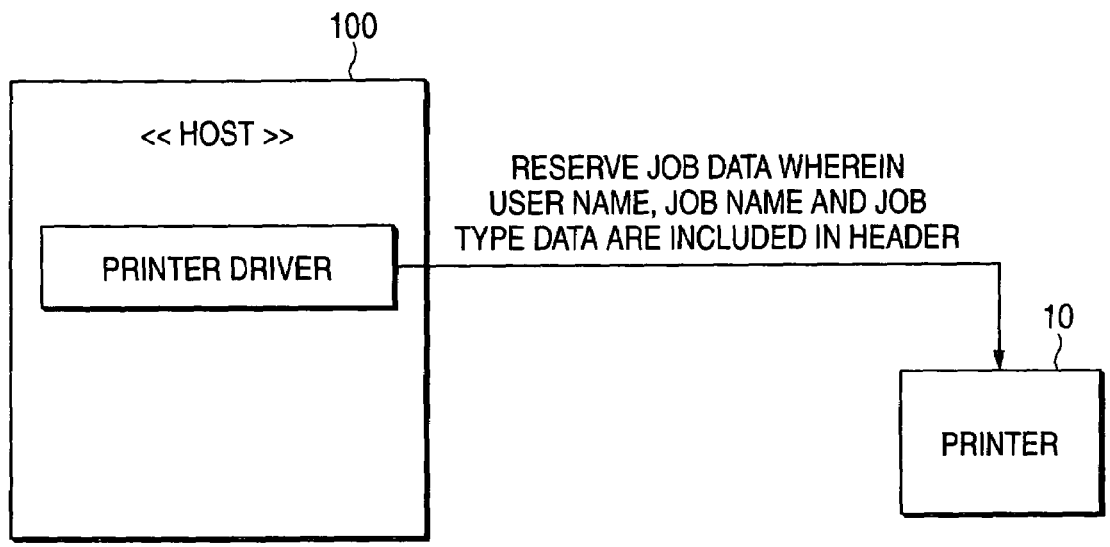
FIGS. 4A and 4B are diagrams for explaining the processing performed by the printing apparatus control program according to the embodiment when printing job data are received.

When the operating condition information has not designated the host 100 prepare a preview file, i.e., when the operating condition information does not indicate that a preview file be prepared, or when the operating condition information has designated that the printing apparatus 10 prepare a preview file, as schematically shown in FIG. 4A, the printing apparatus control program 31 employs the operating condition information and data for a previously received document, as a printing target, from the application program and generates reserve job data that include, in the header, an information group representing various conditions designated by a user and an information group for the document to be printed, and transmits these information groups to the printing apparatus 10. The information group representing the various conditions entered by the user includes a user name, a job name, the number of copies and information indicating the reserve job data type (information indicating that the reserve job data is for either reprint, verify, stored or confidential job data, and whether this information is hereinafter to be referred to as job type information). The information group for the document to be printed includes the file name and the total number of document pages to be printed.

Figure 4B:
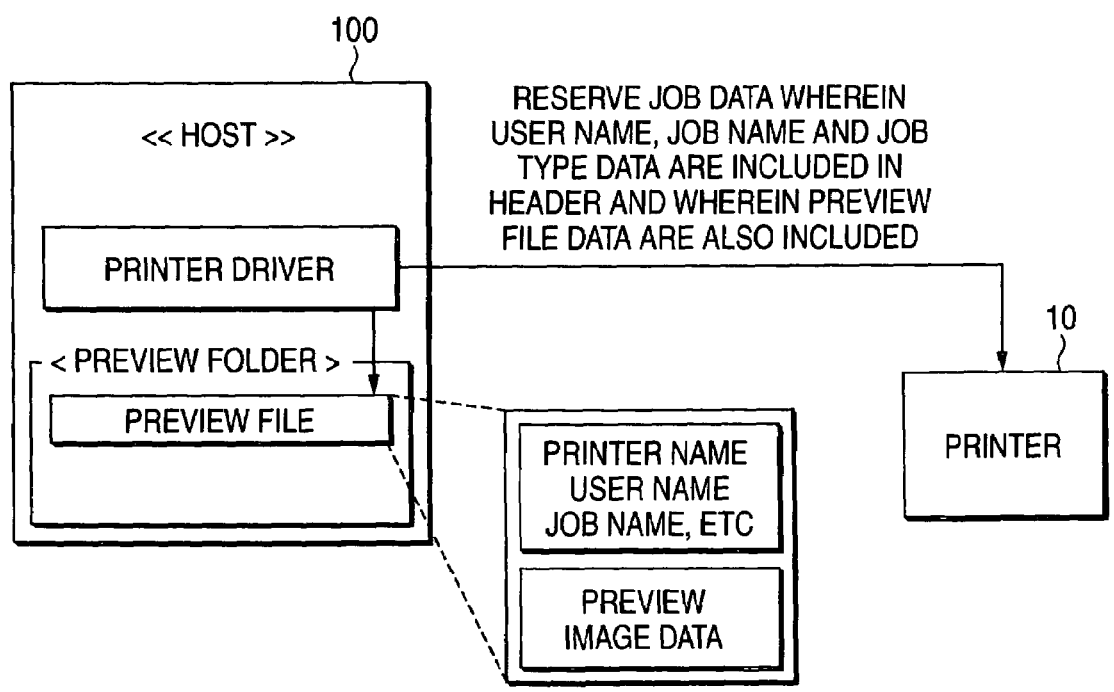

When, as is schematically shown in FIG. 4B, the operating condition information designates the preparation of a preview file by the host 100, the printing apparatus control program 31 performs the processing for generating reserve job data and transmitting the reserve job data to the printing apparatus 10, and performs the processing for creating the preview file and storing the preview file in a preview folder.

More specifically, in this case, the printing apparatus control program 31 performs two processes. In the first process, the printing apparatus control program 31 designates, using a predetermined application marker (a type of marker that can be set up in a JPEG file), the name of the printing apparatus 10 to be used as the network printer (hereinafter referred to as a printing apparatus name), a user name and a job name, and the number of copies and the total number of pages to be printed, as well as the JPEG file for the preview image data (image data having a low resolution) for the first page of a document to be printed. Then, the printing apparatus control program 31 creates, as a preview file, a JPEG file having the same file name as the preview file included in the operating condition information, and stores the JPEG file in the preview folder. In the second process, the printing apparatus control program 31 generates and transmits reserve job data, the header of which includes, together with various other data, preview file designation data (information "¥¥computer name¥folder name used in common¥filename" in this embodiment) that represent the location of the preview file in the network.

When the operating condition information does not designate the generation of reserve job data, the printing apparatus control program 31 performs the processing, based on the operating condition information and the data for a document that is transmitted as a printing target by the application program, for generating normal printing job data (printing job data that does not include data wherein information designating a storage location is not present in the header) and transmitting the printing job data to the printing apparatus 10.

Figure 5:
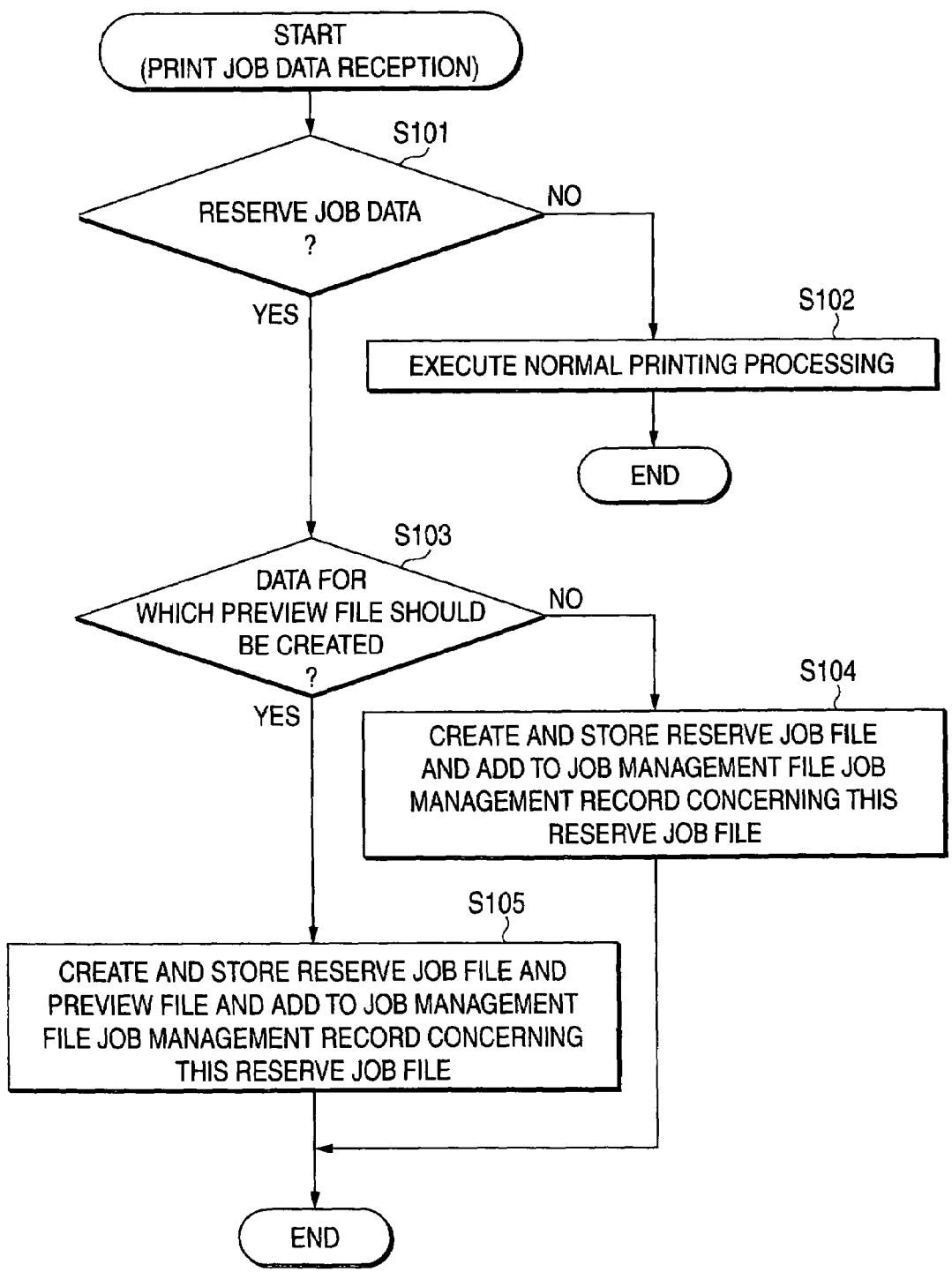
FIG. 5 is a flowchart showing the processing performed by a printing apparatus according to the embodiment when printing job data are received.

When the printing apparatus 10 (controller 11) receives the printing job data from the host 100 (printing apparatus control program 31), the printing apparatus 10 performs the following processing, as shown in FIG. 5.

Specifically, upon receiving the printing job data, the controller 11 employs the information included in the header to determine whether the printing job data that have been received are reserve job data (step S101). When the printing job data are not reserve job data (NO at step S101), the controller 11 performs the normal printing control processing for the printing job data, i.e., generates data having of a predetermined form, based on the printing job data that have been received, and transmits the data to the printing mechanism 13 (step S102). The processing is thereafter terminated.

When the printing job data that have been received are reserve job data (YES at step S101), the controller 11 employs the information included in the header of the reserve job data to determine whether the reserve job data are those for which a preview file should be created (step S103).

When the creation of a preview file is not required for reserve job data (data generated under the conditions existing when the host 100 has been designated for the creation of a preview file, or data generated under the conditions existing when the host 100 has not been designated for the creation of a preview file) (NO at step S103), the controller 11 creates a reserve job file, correlated with the contents of the reserve job data that have been received, stores the reserve job file in the HDD 28, and adds to a job management file a job management record into which various data included in the header of the reserve job data have been entered (step S104).

More specifically, at step S104, based on the reserve job data received from the host 100, the controller 11 generates reserve job data having an intermediate code form (printing job data having a form that facilitates the rapid generation of data to be supplied to the printing mechanism 13). Further, the controller 11 stores in the HDD 28 a reserve job file for the reserve job data having the intermediate code form, so that a unique job ID (a numerical value in this embodiment) can be designated for the reserve job file allocated, by the controller 11, for the previously received reserve job data. In addition, the controller 11 adds to the job management file (see FIG. 2) a job management record, which includes a job ID allocated for the reserved job data that have been received, a registration date, which is the date the reserve job data were received, and a user name, a job name, job type information and preview file designation information that correspond to data included in the header of the reserve job data (when no corresponding data are found, "Null" is entered).

When the received reserve job data are those that require the creation of a preview file (YES at step S103), at step S105, the controller 11 performs the process (the same process as that at step S104) for creating a reserve job file having the contents corresponding to the received reserve job data and storing the reserve job file in the HDD 28, and the process for creating, as a preview file, a JPEG file having a general form (a printing apparatus for which a name is not included) and the file name, "job name included in the header+'.jpg'". Furthermore, the controller 11 also performs the process for adding to the job management file a job management record wherein a job ID is defined as the job ID allocated for the received reserve job data, a registration date is defined as the date of reception of the reserve job data, a user name, a job name and job type information are defined as data corresponding to that included in the header for the reserve job data that were received, and preview file designation information is defined as the "job name included in the header+'.jpg'".

While referring to FIGS. 6 to 9, an explanation will now be given for a function that enables the printing apparatus 10 to accept, for reserve job data, a printing start instruction entered by a user while operating a Web browser.

A function for displaying a Web page, shown in FIG. 6 (hereinafter referred to as a QPJM page), on a host (Web browser) 100 that has accessed the printing apparatus 10 is provided for the controller 11. The QPJM page is actually a Web page (a Web page displayed with another Web page in a Web browser window) displayed in a frame. Also, the QPJM page is a Web page for which various display contents, which will be described later, are changed without new information having to be obtained from the printing apparatus 10, i.e., a Web page for which most of the information stored in the job management file is included in QPJM page source data (hereinafter referred to as QPJM page data) supplied by the printing apparatus 10.

Upon the depression of a list button (a rectangle in which there is a downward pointing triangle) at the right end of a drop-down list box 51 in a QPJM page, a list of user names (no overlapping) stored in the job management file is displayed for the selection, from the list, of a user name. When a list button at the right end of a drop-down list box 52 is depressed, a list of job type data is displayed, for the selection from the list, of job type data.

A list box 53 is used to display a job name list, a registration date and the number of copies (hereinafter referred to as registered job detail data) included in a job management file for each set of reserve job data (each reserve job file) that a user, identified by a user name shown in the drop-down list box 51, has stored in the printing apparatus 10, while designating a job type in the drop-down list box 52.

When specific registered job detail data in the list box 53 is selected, and when a preview file has already been prepared for specific reserve job data (a reserve job file), based on this registered job detail data, preview image data included in the preview file are displayed in a preview image display area 55; the name of the preview file and the sheet size, the printing direction and the resolution of correlated reserve job data (reserve job file) are displayed in a data display area 54; and the number of copies included in the registered job detail data that has been selected is displayed in a copy count entry column 59.

Specifically, when specific registered job detail data are selected, a host (hereinafter referred to as a communication host) 100 that is currently displaying the QPJM page performs the processing (hereinafter referred to as determination processing), based on the QPJM page data that are received from the printing apparatus 10 and are internally stored, for determining whether a reserve job file (hereinafter referred to as a user selected, job file) indicated by the selected, registered job detail data is either one for which a preview file has not yet been created, one for which a preview file has been prepared by the host 100, or one for which a preview file has been prepared by another host 100. For this determination processing, when the user selected, job file is the one for which a preview file has been prepared by the communication host 100, the communication host 100 also performs the processing by which the name of the preview file is specified. It should be noted that during the determination processing, information (information indicating that a preview file has not been prepared, information indicating the name of a preview file that has been stored in the communication host 100, or information designating the acquisition of a preview file from the printing apparatus 10) actually correlated with the registered job detail data that has been selected is read from the QPJM page received from the printing apparatus 10.

When the user selected, job file is the one for which a preview file has not been prepared, the communication host displays in the preview image area 55 information for notifying the user that a preview file has not yet been created, and displays in the copy count entry column 59 the number of copies included in the registered job detail data that has been selected.

When the user selected, job file is the one for which a preview file has been created by the communication host 100, the communication host 100 reads preview image data from an internally stored file (a preview file for the user selected, job file) that is identified by the file name obtained during the determination processing, and displays in the preview image display area 55 images in accordance with the preview image data. Further, the communication host 100 changes the contents displayed in the data display area 54 and the copy count entry column 59 in consonance with the user selected job file. When a file identified by the file name specified in the determination processing is not present in the communication host 100 (which will be described later), the communication host 100 displays data in the preview image display area 55 to notify the user that the display of a preview image has been disabled (a preview file has already been deleted).

When the user selected, job file is one for which a preview file has been prepared by another host apparatus 100, the communication host 100 transmits, to the printing apparatus 10, a preview file request (an HTTP request having specified contents) that includes information (a user name and a job name in this embodiment) representing the registered job detail data that has been selected.

Figure 7:
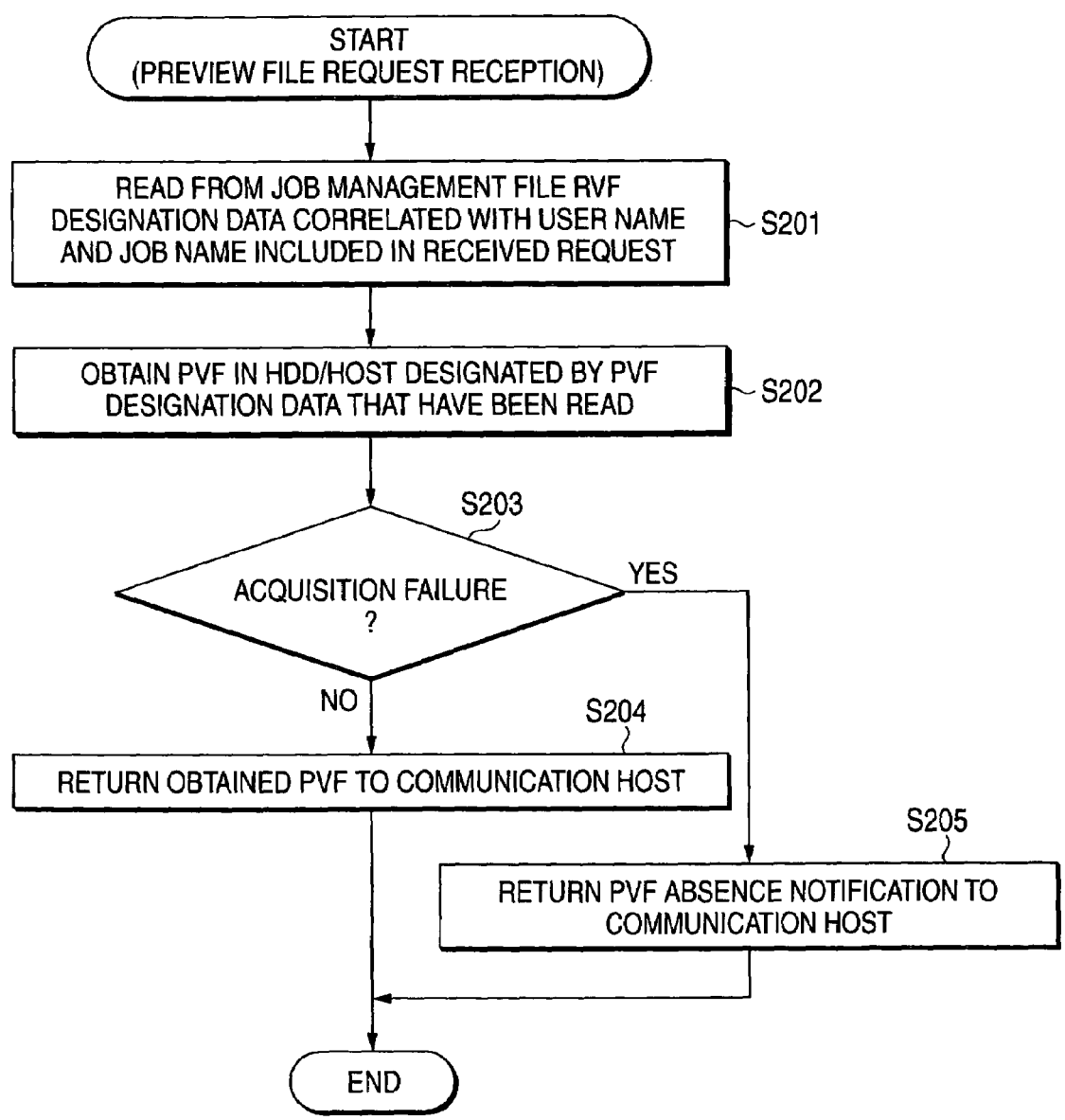
FIG. 7 is a flowchart showing the processing performed by the printing apparatus according to the embodiment when a preview file request is received.

Upon receiving the preview file request, as is shown in FIG. 7, the printing apparatus 10 (controller 11) reads, from the job management file, preview file designation information (PVF designation information in FIG. 7) that is correlated with the user name and the job name included in the previously received preview file request (step S201). Then, the controller 11 obtains, from the HDD 28 or the host 100, a preview file (a PVF in FIG. 7) that is specified by the preview file designation information (step S202).

When the acquisition of a preview file is successful (YES at step S203), the controller 11 returns this preview file to the communication host 100 (step S204) and terminates the processing relative to the received preview file request. When the controller has failed to acquire the preview file (YES at step S203), i.e., when the preview file specified by the preview file designation information is held by a specific host 100 and when communication with the specific host 100 is disabled, or when a preview file can not be obtained by communicating with the specific host 100, the controller 11 returns to the communication host 100 a notification that a preview file (PVF) having predetermined contents is not present (step S205). Thereafter, the processing relative to the received preview file request is terminated.

On the other hand, the communication host that has transmitted the preview file request waits for the reception of a preview file or for a notification from the printing apparatus 10 that a preview file is not present. When a preview file is received, the communication host 100 displays an image in the preview image display area 55 in accordance with preview image data included in the preview file. When a notification that no preview file is present is received, the communication host 100 displays information in the preview image display area 55 to notify the user that the display of a preview image has been disabled.

A delete button 57 on the QPJM page (FIG. 6) is depressed by a user to delete a specific reserve job file from the HDD 28 after registered job detail data for the specific reserve job file has been selected. When the delete button 57 is depressed, the communication host 100 transmits, to the printing apparatus 10, a job delete request that includes the user name, the job name and the job type data correlated with the registered job detail data that has been selected.

Figure 8:
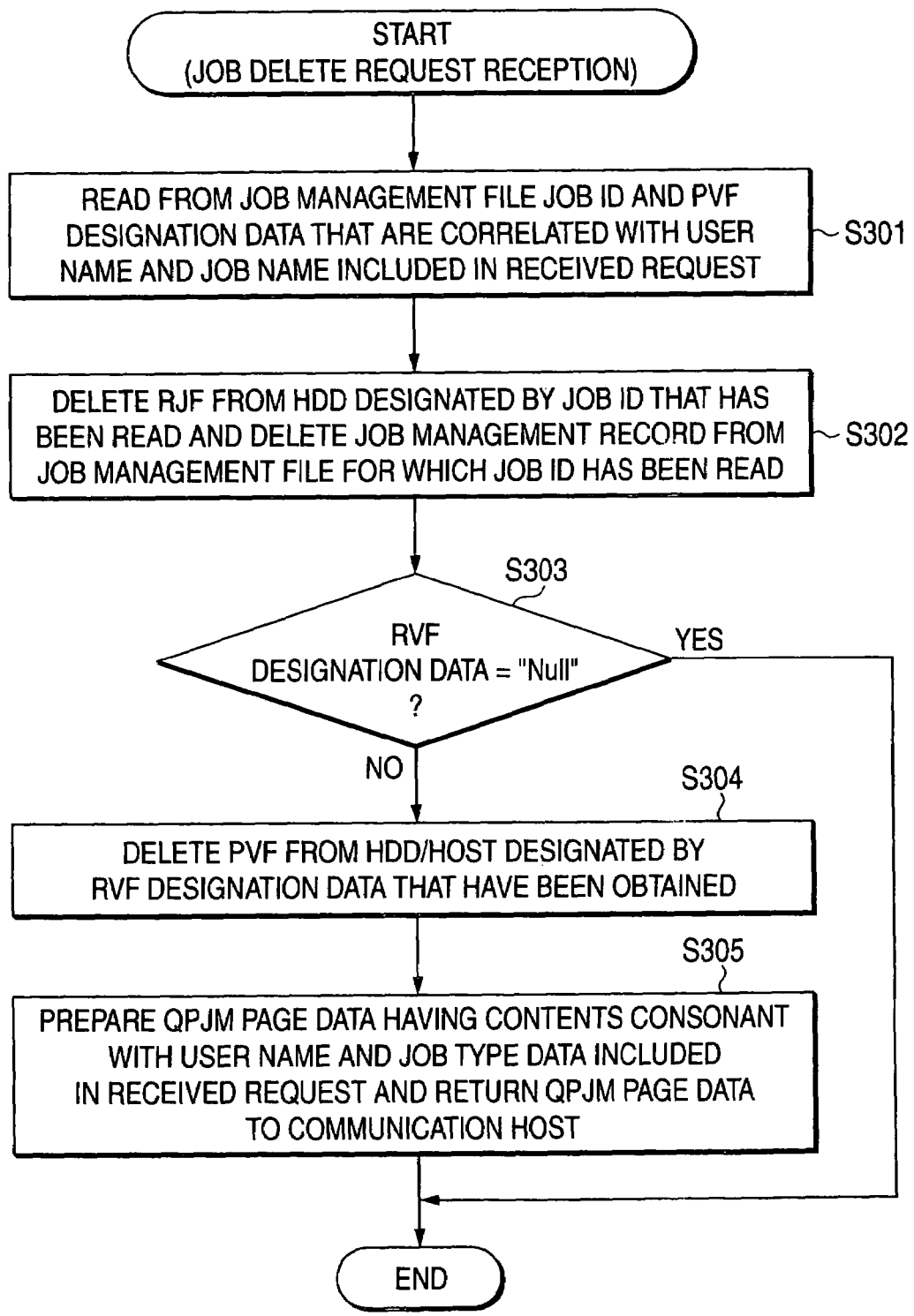
FIG. 8 is a flowchart showing the processing performed by the printing apparatus according to the embodiment when a job delete request is received.

Upon receiving the job delete request, the controller 11, as is shown in FIG. 8, reads from the job management file the job ID and the preview file designation information that are correlated with the user name and the job name included in the previously received job delete request (step S301). Then, the controller 11 deletes from the HDD 28 the reserve job file (RJF in FIG. 8) identified by the obtained job ID, and deletes from the job management file the job management record from which the job ID has been read (step S302).

When the obtained preview file designation information is a "Null" (YES at step S303), the controller 11 terminates the processing relative to the received job delete request. Whereas, when the obtained preview file designation information is not a "Null" (NO at step S303), the controller 11 deletes from the HDD 28 or the host 100 a preview file that is specified by the preview file designation information (step S304). Thereafter, based on the username and the job type data included in the received job delete request, and the information included in the updated job management file, the controller 11 creates QPJM page data, so that the communication host 100 can display a QPJM page that does not present registered job detail data for the reserve job file that has already been deleted. The controller 11 then returns the QPJM page data to the communication host (step S305). Thereafter, the processing relative to the received preview file request is terminated.

A job printing button 58 in the QPJM page (FIG. 6) is depressed by a user to permit the printing apparatus 10 to perform printing based on a specific reserve job file when the user has selected the registered job detail data for the specific reserve job file (and when the number of copies displayed in the copy count entry column 59 has been changed, as needed). When the job printing button 58 is depressed, the communication host 100 transmits to the printing apparatus 10 a job printing request that includes the user name and the job name correlated with the registered job detail data that has been selected, and includes, as copy count designation information, the numerical value entered in the copy count entry column 59.

Figure 9:
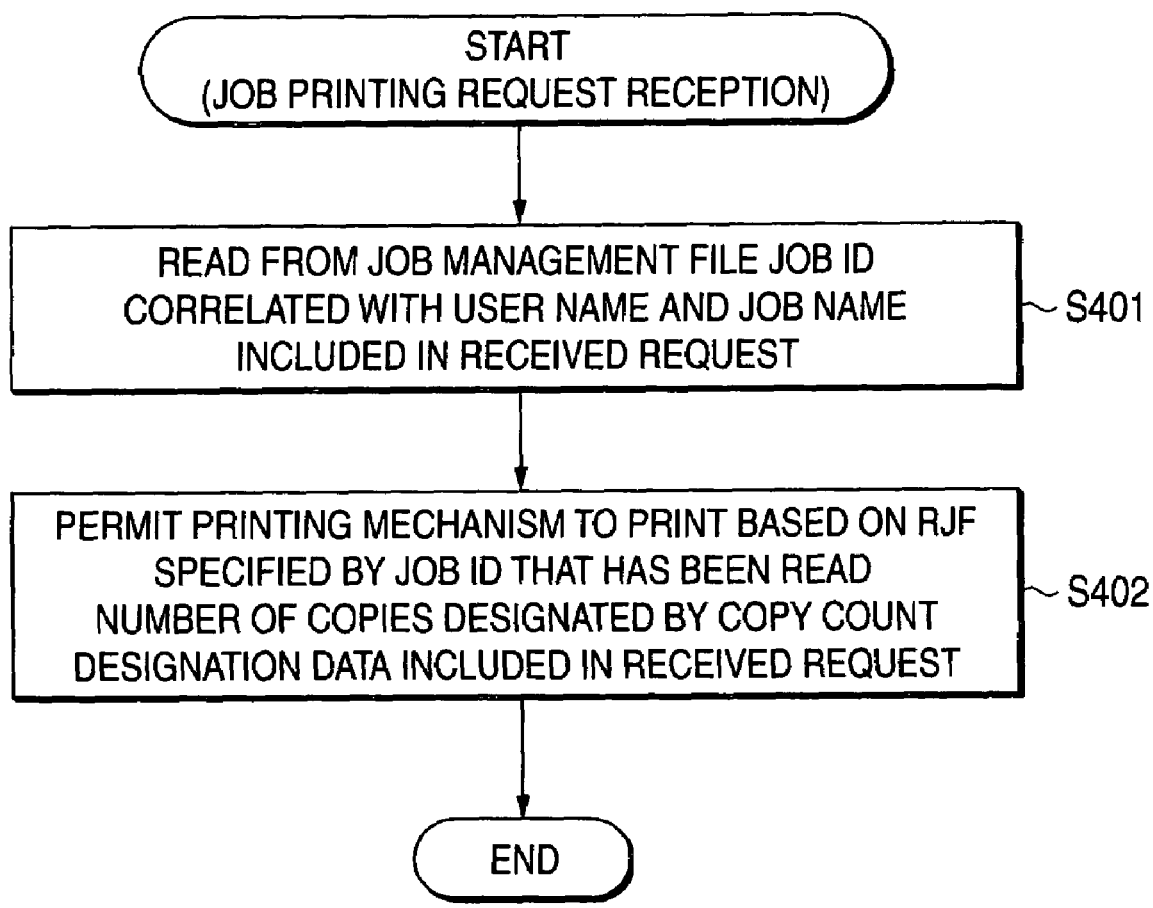
FIG. 9 is a flowchart showing the processing performed by the printing apparatus according to the embodiment when a job printing request is received.

Upon receiving the job printing request, the controller 11, as is shown in FIG. 9, reads from the job management file the job ID that is correlated with the user name and the job name included in the received job printing request (step S401). At step S402, the controller 11 permits the printing mechanism 13 to perform the printing, based on the reserve job file that has been identified using the job ID, of the number of copies designated in the copy count designation information included in the received job printing request.

An explanation will now be given for the function of the utility program 32 and a function provided for the printing apparatus 10 for accepting, through the utility program 32, a user instruction to start the printing of the reserve job data.

As previously described, the first utility program 32 and the second utility program 32 are prepared for the printing system (printing apparatus 10) of this embodiment.

First, an explanation will be given for the function of the first utility program 32 and the operation of the printing apparatus 10 concerning for the first utility program 32.

Figure 10:
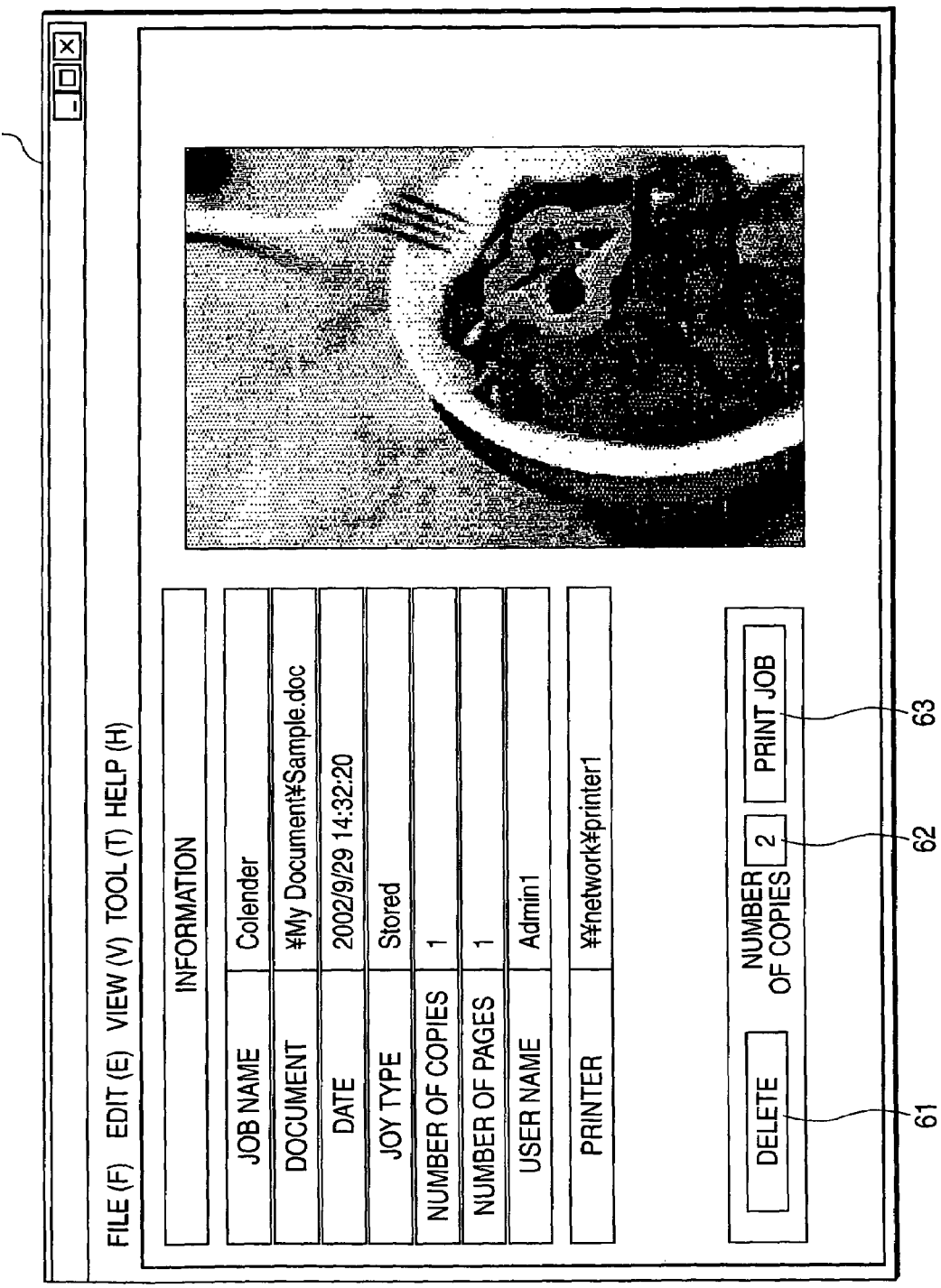
FIG. 10 is a diagram for explaining a window displayed by a first utility program according to the embodiment.

As is shown in FIG. 10, the first utility program 32 can display a window 60 that presents the contents of a preview file designated by a user. When the first utility program 32 is activated, a preview file to be displayed can be designated, and when a shortcut icon has been prepared in advance by a desktop, the contents of a preview file can be displayed merely by dragging and dropping an icon for the preview file on the shortcut icon.

Figure 6:
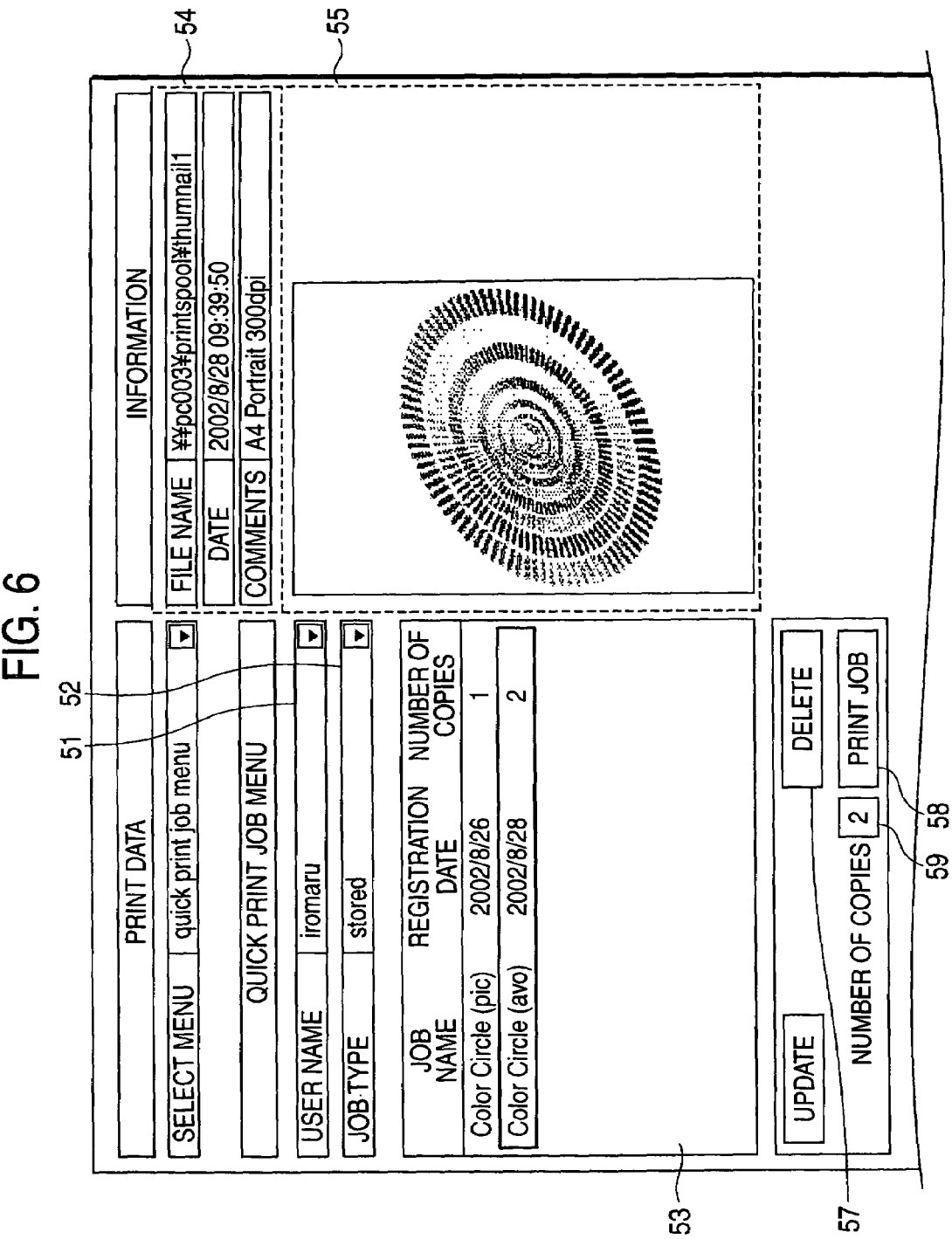
FIG. 6 is a diagram for explaining a QPJM page that the printing apparatus of the embodiment displays using a Web browser.

In the window 60, a delete button 61, a copy count entry column 62 and a job printing button 63 correspond to the delete button 57, the copy count entry column 59 and the job printing button 58 on the QPJM page (FIG. 6). Specifically, a user depresses the delete button 61 to delete, from the printing apparatus 10, job data (reserve job file) for a preview image that is displayed in the window 60. While the user depresses the job printing button 63 to permit the printing apparatus 10 to perform printing based on the reserve job data for which a preview image is currently displayed in the window 60. The copy count entry column 62 is the location whereat the number of copies designated in the preview file is displayed as an initial value, and whereat the user can change this numerical value.

The first utility program 32 performs the following processing when the delete button 61 is depressed.

When the delete button 61 is depressed, the first utility program 32 transmits, to an apparatus (i.e., the printing apparatus 10) identified by the printing apparatus name designated in the preview file that is currently displayed, a job delete command that includes the user name and the job name included in this preview file.

Thereafter, the first utility program 32 waits to receive from the printing apparatus 10 a delete completion notification or a delete failure notification (which will be described later) When the delete completion notification is received, the first utility program 32 deletes the preview file that is currently displayed, and changes the contents displayed in the window 60 to those for which a job name and a preview image are not presented. When the delete failure notification is received, the first utility program 32 performs the same processing as that performed when the reserve job file absence notification is received. That is, the first utility program 32 displays an instruction acquisition dialogue box in the window 60. Then, when an instruction is entered for the deletion of the preview file that is currently displayed, the first utility program 32 erases the instruction acquisition dialogue box from the window 60, deletes the preview file, and changes the contents displayed in the window 60 to those for which a job name and a preview image are not presented. And when an instruction not to delete the preview file that is displayed is entered, the first utility program 32 merely erases the instruction acquisition dialogue box in the window 60.

Figure 11:
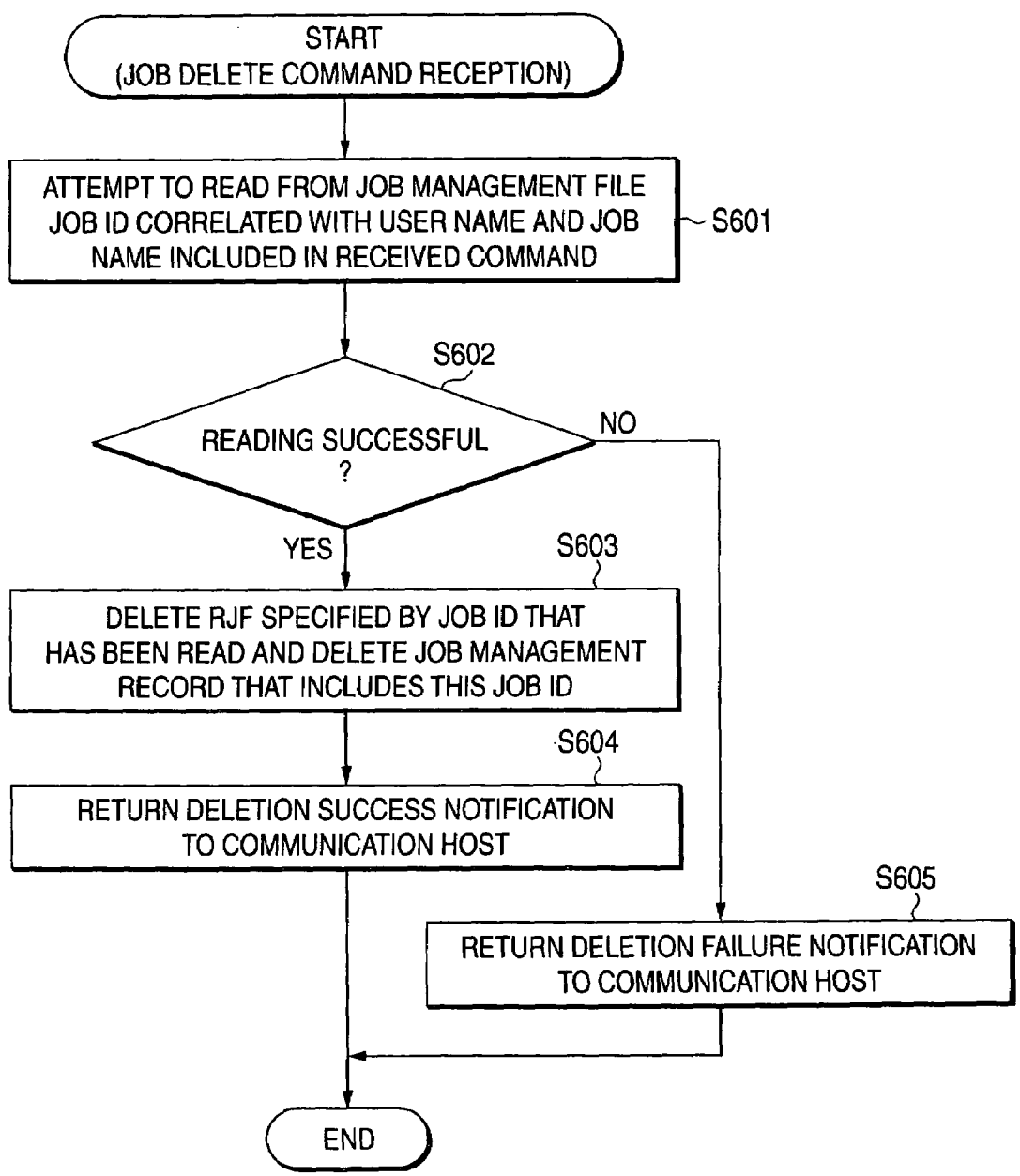
FIG. 11 is a flowchart showing the processing performed by the printing apparatus when a job delete command is received.

On the other hand, the controller 11, upon receiving the job delete instruction command, performs the processing shown in FIG. 11.

Specifically, when the job delete command is received, the controller 11 attempts to read from the job management file the job ID that is correlated with the user name and the job name included in this command (step S601). Then, when the reading of the job ID from the job management file is successful (YES at step S602), the controller 11 erases, from the HDD 28, a reserve job file identified by the job ID, and deletes, from the job management file, the job management record that includes this job ID (step S603). Thereafter, the controller 11 transmits to the host 100 a delete completion notification indicating that the reserve job file has been deleted (step S604). The controller 11 then terminates the processing relative to the previously received, job delete command.

When the job ID correlated with the user name and the job name included in the previously received job delete command can not be read (NO at step S602), the controller 11 transmits to the host 100 a delete failure notification indicating that the deletion process has been disabled because the reserve job file is not present (step S605). Thereafter, the controller 11 terminates the processing relative to the job delete command that has been received. An explanation will be given later citing the reason the processes (steps S602 and S605) are provided for the processing in FIG. 11 in order to cope with a case wherein the reserve job file, the deletion of which has been designated in the previously received job delete command, is not present.

The first utility program 32 also performs the following processing when the job printing button 62 is depressed (FIG. 10).

When the printing job button 63 is depressed, the first utility program 32 transmits to an apparatus (i.e., the printing apparatus 10), identified by the printing apparatus name designated in a preview file that is currently displayed, a job print instruction command having a predetermined form that includes the user name and the job name designated in the preview file (displayed in the window 60), and that also includes, as copy count designation information, the numerical value in the copy count entry column 62.

Thereafter, the first utility program 32 waits for the printing apparatus 10 to receive a printing start notification or a reserve job file absence notification (which will be described later). When the printing start notification is received, the first utility program 32 displays a dialogue box in the window 60 to notify the user that the printing has been initiated.

When the reserve job file absence notification is received, the first utility program 32 displays in the window 60 a dialogue box containing a message for a user indicating that the reserve job file has already been deleted, and an instruction acquisition dialogue box containing two buttons that permit the user to enter an instruction indicating whether the preview file that is displayed should or should not be deleted. When the deletion of a currently displayed preview file is instructed, the first utility program 32 erases the instruction acquisition dialogue box in the window 60, deletes the preview file as instructed, and changes the contents displayed in the window 60 to those for which a job name and a preview image are not presented. When an instruction not to delete the current preview file is entered, the first utility program 32 erases only the instruction acquisition dialogue box in the window 60.

Figure 12:
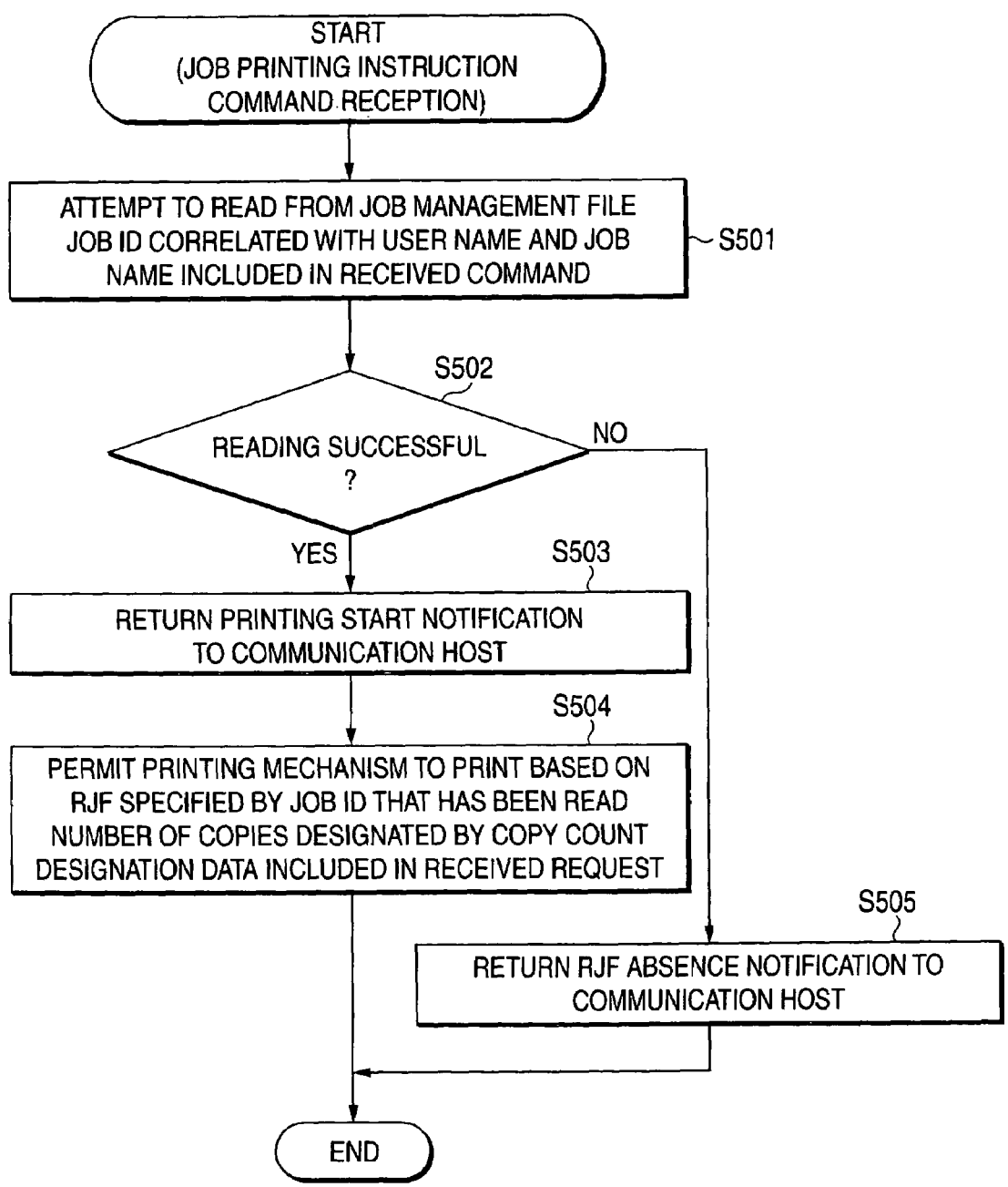
FIG. 12 is a flowchart showing the processing performed by the printing apparatus according to the embodiment when a job printing command is received.

On the other hand, the controller, upon receiving the job printing instruction command, performs the following processing in FIG. 12.

Specifically, upon receiving the job printing instruction command, the controller 11 attempts to read from the job management file the job ID that is correlated with the user name and the job name included in the previously received job printing command (step S501). When the reading of the job ID is successful (YES at step S502), the controller 11 transmits to the communication host a printing start notification having predetermined contents (step S503). Then, the controller 11 permits the printing mechanism 13 to perform the printing, based on the reserve job file identified by the obtained job ID, of the number of copies designated in the copy count designation information that is included in the job printing command (step S504). Thereafter, the controller 11 terminates the processing relative to the received job printing instruction command.

When the job ID correlated with the user name and the job name included in the previously received job printing command can not be read from the job management file (NO at step S502), the controller 11 transmits, to the communication host 100, a reserve job file absence notification having predetermined contents (step S505). Thereafter, the controller 11 terminates the processing relative to the received job printing command. An explanation will also be given later for a reason why the processes (steps S502 and S505) are provided for the processing in FIG. 12 to cope with a case wherein a reserve job file, for which printing has been designated, in the previously received job printing command is not present.

When the job ID correlated with the user name and the job name included in the job printing command can not be read from the job management file (NO at step 502), the controller 11 transmits to the host 100 a reserve job file absence notification indicating that a reserve job file, for which printing is designated, in the job printing command that has been received (step S605). Thereafter, the processing relative to the job printing command is terminated.

The function of the second utility program 32 will now be described.

Figure 13A:
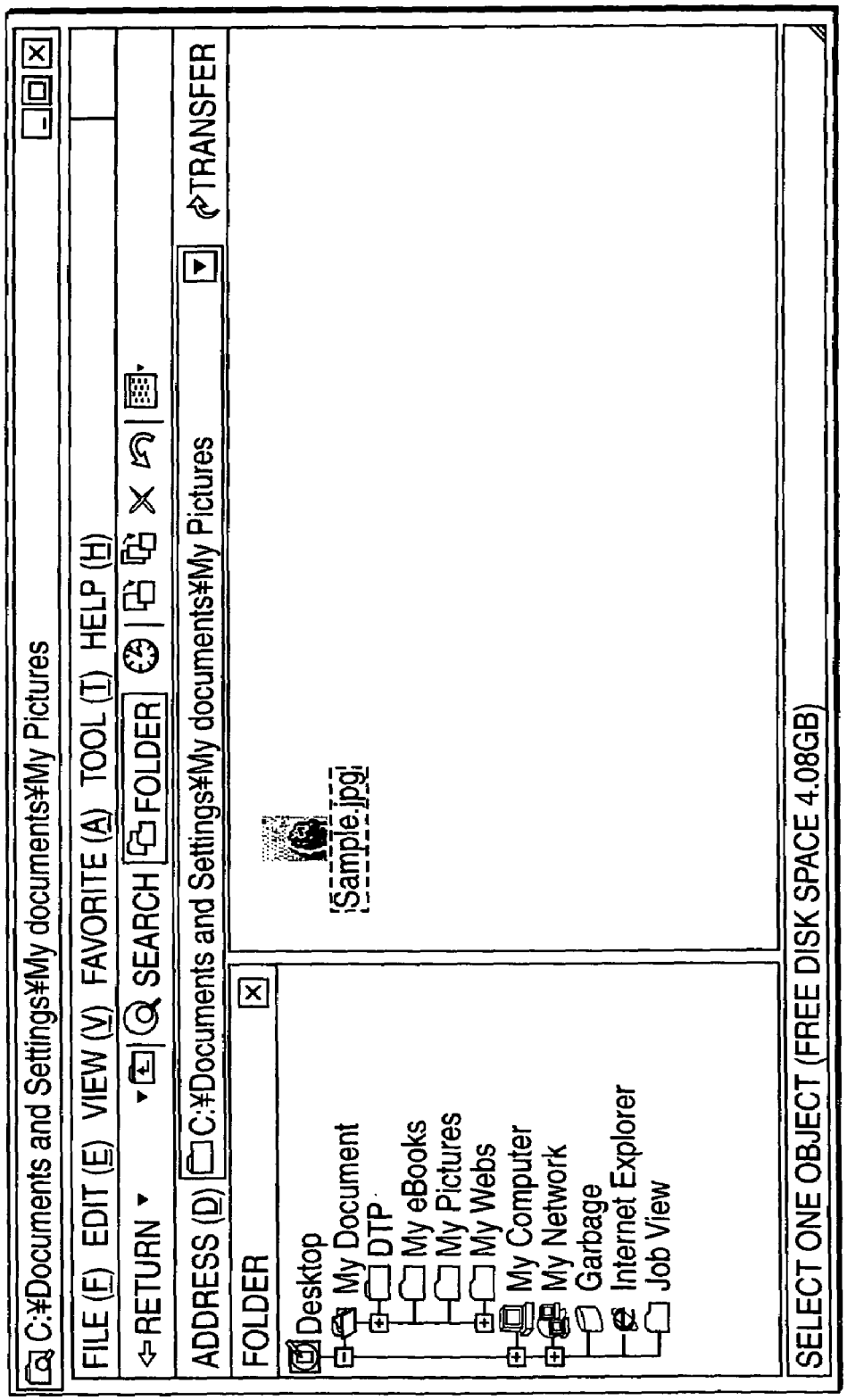
FIG. 13 is a diagram for explaining a property dialogue box displayed by a second utility program according to the embodiment.
Figure 13B:
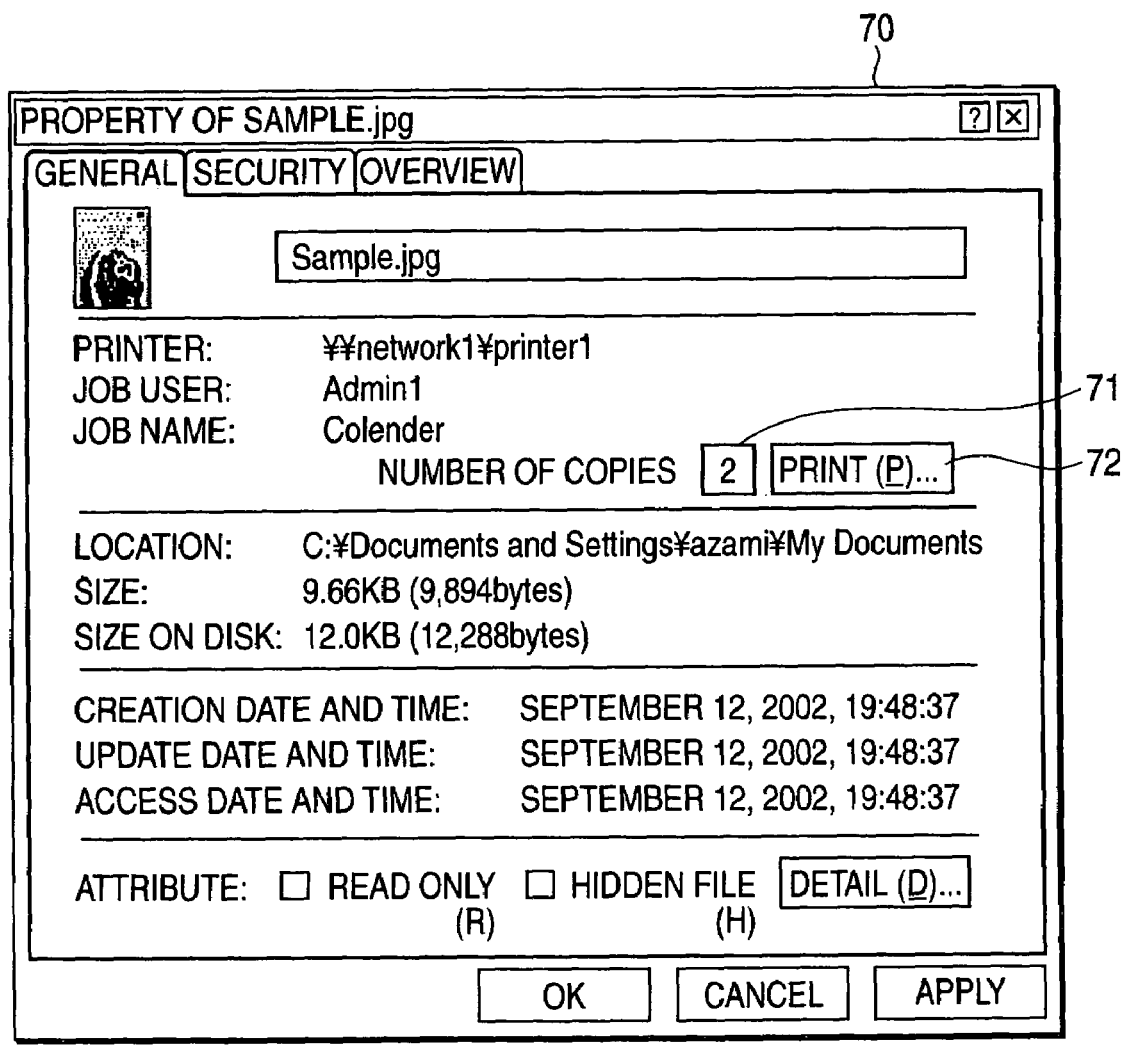

The second utility program 32 is a program (DLL file) that is provided, together with a setup program for writing predetermined data to a registry. The host 100, for which the second utility program 32 has been set up by the setup program, is operated as follows. When, as is shown in FIG. 13A, the user manipulates Explorer to display a preview file icon and to display thereafter a property dialogue box (i.e., clicks the right button of a mouse on the preview file icon to display a context menu and then selects a property), a property dialogue box 70 having the contents shown in FIG. 13B is displayed.

In the property dialogue box 70, "¥¥network¥printer1", "Admin1" and "Calendar" are a printer apparatus name, a user name and a job name established in the preview file. A copy count entry column 71 and a printing button 72 correspond to the copy count entry column 62 and the job printing button 63 in the window 60 (FIG. 1) displayed by the first utility program 32.

That is, when the printing button 72 is depressed, the second utility program 32 transmits to an apparatus (i.e., the printing apparatus 10) identified by the printer name displayed in the property dialogue box 70 a job printing command that includes the user name and the job name displayed in the property dialogue box 70 and the copy count data, a numerical value displayed in the copy count entry column 71.

Thereafter, the second utility program 32 waits to receive from the printing apparatus 10 a printing start notification or a reserve job file absence notification. When the second utility program 32 receives the printing start notification, the program 32 displays in the property dialogue box 70 a dialogue box (having only a confirmation button) containing a message for a user indicating that the printing has been initiated. Whereas, when the second utility program 32 receives the reserve job file absence notification, the second utility program 32 displays, in the property dialogue box 70, a dialogue box (containing only a confirmation button) containing a message for the user concerning the absence of the reserve job file (a message that the reserve job file has already been deleted).

That is, the preview file created by each host 100 of the printing system of the invention is a file that can be employed by being copied to another host 100 in which the first/second utility program 32 has been installed, i.e., a file according to which a job printing command, which permits the printing apparatus 10 to initiate the printing process based on a reserve job file, is transmitted to the first/second utility program 32, even though a corresponding preview file is stored at a location that differs from the original storage location). Further, since the printing system of the invention can issue a deletion instruction for the reserve job file, by employing either a preview file, which permits the copying of the reserve job file, or a Web browser, there are cases wherein the printing apparatus 10 does not include a reserve job file, for which the printing is instructed by the job printing instruction command received from the first/second utility program 32, and wherein the preview file designated by the preview file designation data included in the job management file has already been deleted from the host 100. In order, in these cases, to operate the printing system normally (to prevent the processing from being halted due to an error), each process executed by the controller 11 includes a process for coping with a case wherein there is a target file that may be not present.

As is described in detail, according to the printing system of this embodiment, the host 100 that transmits a reserve job file to the printing apparatus 10 can create a preview file for the reserve job data, and the user of each host 100 can select reserve job data to be printed, while at the same time examining preview images for reserve job data sets that are stored in the printing apparatus 10 and are displayed based on preview files stored in another host 100 or in the printing apparatus 10. Therefore, the printing system of the embodiment permits each host 100 to display the preview images for the reserve job data stored in the printing apparatus 10, and the probability whereat the printing apparatus 10 will be busy is lower than it is for a conventional printing system that provides the same function by permitting the printing apparatus 10 to create a preview file.

Further, according to the printing system of the embodiment, a preview file (corresponding to a printing instruction file) for reserve job data can be prepared by the hosts 100 that transmit the reserve job data to the printing apparatus 10. When the user of each host 100 employs the preview file (opens the preview file using the first/second utility program 32), the job printing command (corresponding to a printing command) is transmitted to the printing apparatus 10 based on the information included in the preview file, and as a result, printing is started by the printing apparatus 10 based on a reserve job file that corresponds to the preview file. Since the job printing command is transmitted based on the information in the preview file while no data is obtained from the printing apparatus, the operation for instructing the printing of reserve job data stored in the printing apparatus can be completed within a short period of time.

A preview file created by each host 100 of the printing system of the embodiment can also be used by permitting it to be copied by another host 100. Therefore, according to the printing system of this embodiment, a specific user can provide for a different user a preview file created by the host 100 used by the specific user, so that the different user can employ the reserve job file stored in the printing apparatus 10 of the specific user.

<Modification>

The printing system of the embodiment can be variously modified. For example, a function for creating a preview file may be removed from the printing apparatus 10, and the printing apparatus control program 31 may be a program that can not issue an instruction to the printing apparatus 10 for the creation of the preview file. According to the printing system of the embodiment, a preview file stored in a specific host 100 is supplied, through the printing apparatus 10, to another host 100 that requires the preview file. However, the printing system may also be modified so that the host 100 that requires a specific preview file can receive, from the printing apparatus 10, the preview file designation data for the specific preview file, and based on the received preview file designation data, can exchange the preview file with another host 100.

According to the printing system of the embodiment, the reserve job data received from the host 100 is converted into reserve job data having a intermediate code form, and the reserve job data having this form are stored in the printing apparatus 10. However, the reserve job data received from the host 100 may be stored in the printing apparatus 10 without the form being changed. In addition, a preview file created by the host 100 or the printing apparatus 10 may be a file, such as a multi-page file, other than a JPEG file. Further, the contents (structures) of the operating condition setup dialogue box, the window 60 and the property dialogue box 70 that are displayed by the printing apparatus control program 31 or the utility program 32 may differ from those described for the embodiment.

In the embodiment, each host 100 (which employs the printing apparatus control program 31) creates preview files, to include preview image data; however, the printing apparatus control program 31 may be used to prepare a file that does not include preview image data, but that does include a printing apparatus name, a user name and a job name.

Furthermore, according to the printing system of the embodiment, the reserve job data received from the host 100 is converted into reserve job data having an intermediate code form that is stored in the printing apparatus 10. However, reserve job data received from the host 100 may be stored unchanged in the printing apparatus 10. A preview file prepared by the host 100 or the printing apparatus 10 may be a file, such as one for a multi-page form, other than a JPEG file. The function of the first/second utility program 32 may be provided for the printing apparatus control program 31, and the contents (structures) of the operating condition setup box, the window 60 and the property dialogue box 70, which are displayed by the printing apparatus control program 31 and the utility program 32, may differ from those described for the embodiment.

The present invention is not limited to the mode for carrying out the invention and the embodiment thereof at all, and includes various modifications that can be conceived easily by those skilled in the art, without departing from the scope of claim.

What is claimed is:

1. A printing system
    wherein a printing apparatus and one or more hosts are interconnected across a network;
    wherein each of the hosts includes
        a preview file storage unit,
        a reserve job data generator/transmitter for, before reserve job data are generated and transmitted as print job data for storage in the printing apparatus, creating a preview file, constituting an image data file representing an overview of printed matter to be generated by said printing apparatus based on the reserve job data, and storing the preview file in the preview file storage means, and for performing a reserve job data generation/transmission process during which reserve job data, which include location information for designating a storage location for the preview file, content information for designating the contents of the printed matter to be printed by the printing apparatus and identification information for job designation information for internal data, are generated and transmitted to the printing apparatus,
        a transmission request response unit for responding to a transmission request, received from another apparatus, for a preview file stored in the preview file storage unit, and
        a printing instruction information transmitter that serves as a unit having a function for displaying images based on the preview files stored in the preview file storage unit of the host and in the preview file storage units of the other hosts, and a function for transmitting, to the printing apparatus, printing instruction information that includes the job designation information for the reserve job data corresponding to a preview file for which an image display is currently being performed, and that also serves as a unit that is activated upon the reception of various types of information from another apparatus;
    wherein the printing apparatus includes
        a reserve job file storage unit for storing, in correlation with the job designation information, the reserve job files, including the information that designates the contents of printed material,
        a management information storage unit for storing, for each reserve job file stored in the reserve job file storage unit, management information that includes the job designation information and the storage location information,
        a reserve job file creation unit for, upon receiving the reserve job data from a specific host, creating the reserve job file based on the reserve job data and storing the reserve job file in the reserve job file storage unit, and for adding, to the management information storage unit, the management information that includes the storage location information and the job designation information included in the reserve job data,
        an information transmitter capable of transmitting, to each of the hosts, the job designation information included in each set of the management information stored in the management information storage unit, and information corresponding to the storage location information included in the management information, and
        a reserve job printing unit for, upon receiving the printing instruction information from the specific host, initiating printing based on the reserve job file that is stored in the reserve job file storage unit in correlation with the job designation information included in the printing instruction information.

2. A printing system according to claim 1, wherein the information transmitter of the printing apparatus is a unit that, to transmit information corresponding to the storage location information included in the management information, obtains a preview file, specified by the storage location information, from a host holding the preview file and transmits the preview file; and wherein the printing instruction information transmitter of each of the hosts is a unit that is activated by obtaining, from the printing apparatus, the preview files stored in the preview file storage units of the other hosts.

3. A printing system according to claim 1,
wherein at least one of the hosts includes, as the reserve job data generator/transmitter,
a unit having a function for performing the reserve job data generation and transmission process, and a function for performing a second reserve job data generation and transmission process that, instead of creating the preview file, generates and transmits the printing apparatus, second reserve job data, which includes creation instruction information for instructing the printing apparatus to create the preview file, information designating the contents of the material to be printed by the printing apparatus and the job designation information;
wherein the printing apparatus further includes
an internal preview file storage unit for storing preview files;
wherein the reserve job file generator is a unit that, upon receiving the second reserve job data, employs the second reserve job data to create the reserve job file and the preview file and respectively stores the reserve job file and the preview file in the reserve job file storage unit and the internal preview file storage unit, and that adds to the management information storage unit management information, including the location designation information designating the preview file and the job designation information included in the second reserve job data that are received; and
wherein the information transmitter is a unit that is capable of transmitting, to each of the hosts, the job designation information included in each set of management information stored in the management information storage unit, information corresponding to the storage location information included in the management information, and each preview file stored in the internal preview file storage unit.

4. A printing apparatus, used to connect to one or more hosts across a network, comprising:
a reserve job file storage unit for storing, in correlation with job designation information, reserve job files including information for designating the contents of printed material;
a management storage unit for storing, for each of the reserve job files stored in the reserve job file storage unit, management information that includes the job designation information and storage location information;
a reserve job file generator for, upon receiving from a specific host reserve job data, which are print job data including the storage location information indicating the storage location of a preview file, information for designating the contents of printed matter and job designation information that is identification information for internal data, employing the reserve job data to create the reserve job file and storing the reserve job file in the reserve job file storage unit, and for adding to the management information storage unit management information including the storage location information and the job designation information that are included in the reserve job data;
an information transmitter capable of transmitting, to each of the hosts, the job designation information in each set of management information stored in the management information storage unit, and information corresponding to the storage location information included in the management information; and
a reserve job printing unit for, upon receiving from a specific host printing instruction information including the job designation information, initiating printing based on a reserve job file that is stored in the reserve job file storage unit in correlation with the job designation information.

5. A printing apparatus according to claim 4, wherein the information transmitter of the printing apparatus is a unit that, to transmit information corresponding to the storage location information included in the management information, obtains a preview file, specified by the storage location information, from a host holding the preview file and transmits the preview file.

6. A printing apparatus according to claim 4, further comprising:
an internal preview file storage unit for storing preview files,
wherein the reserve job file generator is a unit that, upon receiving the second reserve job data, employs the second reserve job data to create the reserve job file and the preview file and respectively stores the reserve job file and the preview file in the reserve job file storage unit and the internal preview file storage unit, and that adds to the management information storage unit management information, including the location designation information designating the preview file and the job designation information included in the second reserve job data that are received, and
wherein the information transmitter is a unit that is capable of transmitting, to each of the hosts, the job designation information included in each set of management information stored in the management information storage unit, information corresponding to the storage location information included in the management information, and each preview file stored in the internal preview file storage unit.

7. A computer-readable medium comprising a printing apparatus control program, which is to be executed by a computer connected to a printing apparatus across a network, to supply print job data to the printing apparatus, which operates the computer as an apparatus comprising:
a preview file storage unit; and
a reserve job data generator/transmitter for, before reserve job data are generated and transmitted as print job data for storage in the printing apparatus, creating a preview file, constituting an image data file representing an overview of printed matter to be generated by said printing apparatus based on the reserve job data, and storing the preview file in the preview file storage means, and for performing a reserve job data generation/transmission process during which reserve job data, which include location information for designating a storage location for the preview file, content information for designating the contents of the printed matter to be printed by the printing apparatus and identification information for job designation information for internal data, are generated and transmitted to the printing apparatus.

8. A computer-readable medium comprising a printing apparatus control program according to claim 7, which operates the computer as an apparatus comprising:
a unit having a function for performing the reserve job data generation and transmission process, and
a function for performing a second reserve job data generation and transmission process that, instead of creating the preview file, generates and transmits the printing apparatus, second reserve job data, which includes creation instruction information for instructing the printing apparatus to create the preview file, information designating the contents of the material to be printed by the printing apparatus and the job designation information.

9. A printing system
wherein one or more hosts, each of which includes a display device and an input device, and a printing apparatus are interconnected across a network;
wherein each of the hosts includes
  a printing instruction file storage unit,
  a reserve job data generator/transmitter for generating reserve job data, which includes content definition data that define the contents of printed material and unique identification information, and transmitting the reserve job data to the printing apparatus for storage, and for generating a printing instruction file, which includes the same identification information stored in the reserve job data, and storing the printing instruction file in the printing instruction file storage unit, and
  a printing command transmitter having a function for displaying, on the display device, names of printing instruction files stored in the printing instruction file storage unit, and a function for, when a printing instruction, including the designation of a printing instruction file, is entered into the input device, transmitting to the printing apparatus a printing command that includes the identification information in the printing instruction file that has been designated; and
wherein the printing apparatus includes
  a reserve job data processor for internally storing the reserve job data received from the host, and
  a printing unit for, when the printing command is received from the host, performing printing based on the reserve job data internally stored by the reserve job data processor and identified by the identification information included in the received printing command.

10. A printing system according to claim 9,
wherein the reserve job data generator/transmitter of each of the hosts is a unit for generating reserve job data that includes unique identification information and content definition data, which define the contents of printed material, and transmitting the reserve job data to the printing apparatus, and for generating a printing instruction file that includes the unique identification information and image data representing an overview of the printed material and storing the printing instruction file in the printing instruction file storage unit; and
wherein the printing command transmitter of the host is a unit having
  a function for displaying, on the display deice, names of printing instruction files stored in the printing instruction file storage unit,
  a function for displaying, on the display device, images in accordance with the image data included in the printing instruction files that are stored in the printing instruction file storage unit, and
  a function for, when a printing instruction including the designation of a printing instruction file is entered using the input device, transmitting to the printing apparatus a printing command that includes identification information contained in the printing instruction file that has been designated.

11. A computer-readable medium comprising a printing control program, which is to be executed by a computer connected to a printing apparatus that includes a function for internally storing reserve job data that are received and that includes content definition data, which defines the contents of printed material, and unique identification information, and a function for, upon the reception of a printing command having a predetermined form that includes identification information, performing printing based on reserve job data that are internally stored and are identified by the identification information, and which permits the computer to serve as an apparatus comprising:
  a printing instruction file storage unit; and
  a reserve job data generator/transmitter, for generating the reserve job data that include the content definition data that define the contents of a printed material and the unique identification information and transmitting the reserve job data to the printing apparatus, and also for generating a printing instruction file, which includes the identification information that are also contained in the reserve job data and according to which a predetermined program transmits to the printing apparatus the printing command that includes the identification information held in the printing instruction file, and for storing the printing instruction file in the printing instruction file storage unit.

12. A computer-readable medium comprising a printing control program according to claim 11, which permits the computer to serve as an apparatus, the reserve job data generator/transmitter, comprising,
  a unit for generating reserve job data including content definition data, which define the contents of printed material, and unique identification information, and transmitting the reserve job data to the printing apparatus, and also generating a printing instruction file, which includes the identification information and image data representing an overview of the printed material and according to which the predetermined program displays an image in accordance with the image data included in the printing instruction file and transmits to the printing apparatus the printing command that includes the identification information held in the printing instruction file, and for storing the printing instruction file in the printing instruction file storage unit.

* * * * *